(12) United States Patent
Onodera et al.

(10) Patent No.: US 8,671,662 B2
(45) Date of Patent: Mar. 18, 2014

(54) EXHAUST GAS PURIFYING SYSTEM AND EXHAUST GAS PURIFYING METHOD USING THE SAME

(75) Inventors: Hitoshi Onodera, Yokosuka (JP); Masayuki Fukuhara, Kisarazu (JP); Hiroshi Akama, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 379 days.

(21) Appl. No.: 13/058,404

(22) PCT Filed: Aug. 10, 2009

(86) PCT No.: PCT/JP2009/064114
§ 371 (c)(1),
(2), (4) Date: Feb. 10, 2011

(87) PCT Pub. No.: WO2010/018807
PCT Pub. Date: Feb. 18, 2010

(65) Prior Publication Data
US 2011/0131952 A1 Jun. 9, 2011

(30) Foreign Application Priority Data
Aug. 11, 2008 (JP) ................................ P2008-206848

(51) Int. Cl.
*F01N 3/00* (2006.01)
*F01N 3/10* (2006.01)
(52) U.S. Cl.
USPC .................... 60/285; 60/274; 60/286; 60/301
(58) Field of Classification Search
USPC ............................. 60/274, 285, 286, 301, 303
See application file for complete search history.

(56) References Cited

U.S. PATENT DOCUMENTS

| | | | |
|---|---|---|---|
| 3,637,344 A | * | 1/1972 | Thompson ................. 423/213.5 |
| 6,461,579 B1 | | 10/2002 | Hachisuka et al. |
| 6,729,303 B2 | | 5/2004 | Itoyama et al. |

FOREIGN PATENT DOCUMENTS

| | | | | |
|---|---|---|---|---|
| JP | 3-94816 | A | 4/1991 | |
| JP | 4-83516 | A | 3/1992 | |
| JP | 04083516 | A * | 3/1992 | ............ B01D 53/94 |
| JP | 6-190245 | A | 7/1994 | |
| JP | 2000-301000 | A | 10/2000 | |
| JP | 2002-266634 | A | 9/2002 | |
| JP | 2004-92607 | A | 3/2004 | |
| JP | 2005-146900 | A | 6/2005 | |
| JP | 3741303 | B2 | 11/2005 | |
| JP | 2006-83775 | A | 3/2006 | |
| JP | 2006-291847 | A | 10/2006 | |
| JP | 3918402 | B2 | 2/2007 | |
| WO | WO 2008/045626 | A1 | 4/2008 | |

\* cited by examiner

*Primary Examiner* — Thomas Denion
*Assistant Examiner* — Audrey K Bradley
(74) *Attorney, Agent, or Firm* — Foley & Lardner LLP

(57) ABSTRACT

An exhaust gas purifying system (100) includes: a NOx purifying catalyst (34) that is disposed in an exhaust gas flow path (3) to purify nitrogen oxide; and an HC generator (33, 133) that is disposed upstream of the NOx purifying catalyst (34) in the exhaust gas flow path (3) to generate at least one of acetylene, a hydrocarbon with a carbon number of 2 to 5 other than acetylene, and an aromatic hydrocarbon from a hydrocarbon contained in an exhaust gas. In addition, an exhaust gas purifying method using the exhaust gas purifying system includes the step of adjusting an oxygen concentration in the exhaust gas supplied to the HC generation catalyst (33A, 133A) to 0.8 to 1.5 vol % when an air-fuel ratio is stoichiometric or rich.

15 Claims, 12 Drawing Sheets

EXHAUST GAS PURIFYING SYSTEM AND EXHAUST GAS PURIFYING METHOD USING THE SAME

TECHNICAL FIELD

The present invention relates to an exhaust gas purifying system capable of purifying exhaust gas from an internal combustion engine effectively, and an exhaust gas purifying method using the system.

BACKGROUND ART

In recent years, in consideration of a global environment, a reduction in carbon dioxide ($CO_2$) emissions has been desired. Therefore, enhancements of lean burn operation are being made in order to achieve better fuel consumption of an internal combustion engine of a vehicle. Examples of a lean burn engine include a lean-burn gasoline engine, a direct-injection engine and a diesel engine. However, a conventional three-way catalyst cannot reduce and purify nitrogen oxide (NOx) effectively since exhaust gas emitted from the above-mentioned engines contains a lot of oxygen. Therefore, advances are being made in the development in the effective purification of the exhaust gas in various ways.

One of effective methods to purify the exhaust gas is to use a NOx trap catalyst. The NOx trap catalyst oxidizes and traps NOx in the exhaust gas when an air-fuel ratio is lean, while the NOx trap catalyst releases the trapped NOx to reduce to nitrogen ($N_2$) when the air-fuel ratio is stoichiometric or rich. In such a case, the NOx trap catalyst reduces the NOx by increasing a reducing agent (hydrogen ($H_2$), carbon monoxide (CO), hydrocarbon (HC)) in the exhaust gas. However, the excessive reducing agent, especially excessive hydrocarbon, is released without used for the NOx reduction, and the released reducing agent reacts with oxygen, which may cause the emission amount of $CO_2$ to increase. Further, the rapid shift of the air-fuel ratio of the exhaust gas to stoichiometric or rich in order to increase the reducing agent in the exhaust gas unfavorably causes degradation of driving performance and fuel consumption.

In view of this, attempts to use more effective reducing agents, especially hydrogen, are being developed with respect to the NOx reduction. In addition, a catalyst that generates hydrogen by steam reforming has been proposed (for example, refer to Patent Document 1).

CITATION LIST

Patent Literature

Patent Document 1: Japanese Patent No. 3741303

SUMMARY OF INVENTION

However, since the steam reforming reaction is an endothermic reaction, a heat supply to obtain a sufficient reaction rate, namely a heat supply under a high-temperature condition, is required. Therefore, under a condition of an actual driving mode, such as a case where a driving load is low, it can hardly be said that hydrogen is supplied enough to obtain a NOx purification effect. Moreover, when the air-fuel ratio is shifted to rich in order to improve a NOx conversion rate (reduction rate), the emission amount of an unreacted hydrocarbon increases, which leads to environmental degradation. As a result, an additional catalyst was required so as to remove such a hydrocarbon.

As described above, it can hardly be said that reducing gas containing sufficient hydrogen or carbon monoxide is supplied to a catalyst in order to improve the NOx purification efficiency in the conventional methods. Further, it cannot be considered that the supplied reducing gas is effectively used in order to improve the purification efficiency of nitrogen oxide.

The present invention has been devised in view of such conventional problems. It is an object of the present invention to provide an exhaust gas purifying system to improve purification efficiency of nitrogen oxide by generating reducing gas such as hydrogen from an unburned hydrocarbon in an exhaust gas and using the reducing gas effectively, and also to provide an exhaust gas purifying method using the system.

It is a first aspect of the present invention to provide an exhaust gas purifying system comprising: a NOx purifying catalyst that is disposed in an exhaust gas flow path to purify nitrogen oxide; and an HC generator that is disposed upstream of the NOx purifying catalyst in the exhaust gas flow path to generate at least one of acetylene, a hydrocarbon with a carbon number of 2 to 5 other than acetylene, and an aromatic hydrocarbon from a hydrocarbon contained in an exhaust gas.

It is a second aspect of the present invention to provide an exhaust gas purifying method comprising: providing an exhaust gas purifying system comprising: a NOx purifying catalyst that is disposed in an exhaust gas flow path to purify nitrogen oxide; and a HC generation catalyst that is disposed upstream of the NOx purifying catalyst in the exhaust gas flow path to generate at least one of acetylene, a hydrocarbon with a carbon number of 2 to 5 other than acetylene, and an aromatic hydrocarbon from a hydrocarbon contained in an exhaust gas; and adjusting an oxygen concentration in the exhaust gas supplied to the HC generation catalyst to 0.8 to 1.5 vol % when an air-fuel ratio is stoichiometric or rich.

DESCRIPTION OF EMBODIMENTS

The following are descriptions of an exhaust gas purifying system and an exhaust gas purifying method according to the present invention with reference to the drawings. Note that, in this description, "%" with respect to concentrations, contents, blending quantities and the like represents a mass percentage unless otherwise specified.

First Embodiment

Exhaust Gas Purifying System

Figure 1:
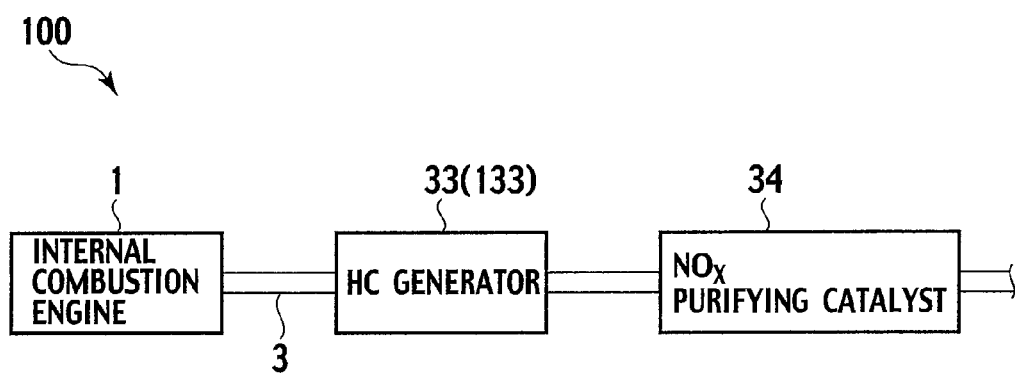
FIG. 1 is a schematic view showing an exhaust gas purifying system according to an embodiment of the present invention.

FIG. 1 is an explanatory view schematically showing an exhaust gas purifying system according to First Embodiment of the present invention. As shown in FIG. 1, an exhaust gas purifying system 100 of the present embodiment includes a flow path 3 of an exhaust gas emitted from an internal combustion engine 1 such as a lean-burn engine, a direct-injection engine and a diesel engine, and further includes a NOx purifying catalyst 34 and an HC generator 33 provided in the flow path 3. The NOx purifying catalyst 34 has a function to purify nitrogen oxide in an exhaust gas. The HC generator 33 is provided upstream of the NOx purifying catalyst 34, and has a function to generate acetylene ($C_2H_2$) and/or a hydrocarbon with a carbon number of 2 to 5 (C2 to C5) other than acetylene from a hydrocarbon in an exhaust gas emitted from the internal combustion engine 1.

As for the HC generator 33, a HC generation catalyst 33A, which generates acetylene and/or the hydrocarbon with the carbon number of 2 to 5 other than acetylene from the hydrocarbon in the exhaust gas, may be used. The HC generation catalyst 33A preferably includes an HC conversion catalyst that converts the hydrocarbon in the exhaust gas emitted from the internal combustion engine 1 into a lower hydrocarbon with the carbon number of 2 to 5, and includes an OSC material having a high oxygen absorption and release property. Examples of the HC conversion catalyst include platinum (Pt), palladium (Pd), rhodium (Rh), and an arbitrary mixture of those. Examples of the OSC material include transition metal, specifically an oxide of cerium (Ce) or praseodymium (Pr). Examples of such an oxide include cerium dioxide ($CeO_2$) or praseodymium oxide ($Pr_6O_{11}$).

Figure 2:
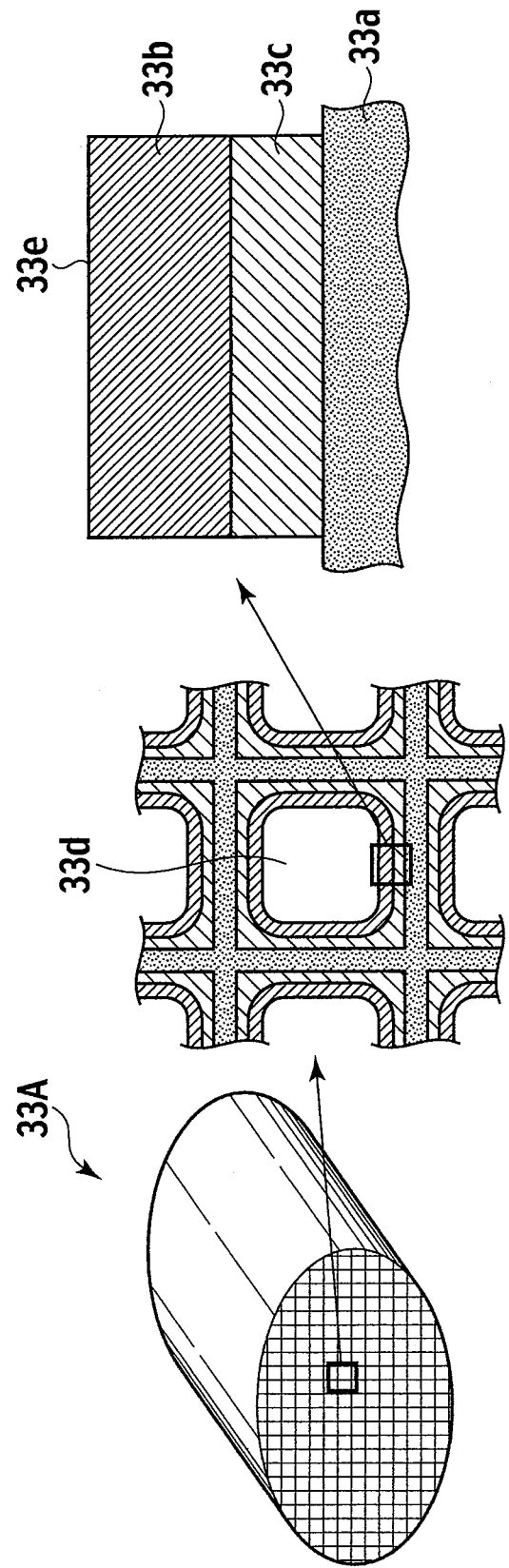
FIG. 2 is a perspective view and a partially enlarged view showing an example of a HC generation catalyst used in an exhaust gas purifying system according to First Embodiment.

FIG. 2 is a perspective view and a partially enlarged view showing an example of the HC generation catalyst 33A used in the exhaust gas purifying system. The HC generation catalyst 33A includes a cordierite honeycomb monolithic substrate 33a on which HC conversion catalyst layers 33b and 33c are supported. The HC conversion catalyst layer 33c contains an HC conversion catalyst that converts a hydrocarbon in the exhaust gas emitted from the internal combustion engine 1 into a lower hydrocarbon by an oxidative dehydrogenation reaction or cracking or the like. In addition, the HC conversion catalyst layer 33b contains both the HC conversion catalyst and the OSC material.

The HC generation catalyst 33A may be provided with a plurality of layers, on the honeycomb substrate, arbitrarily selected from a layer only including the HC conversion catalyst, a layer only including the OSC material and a layer including both the HC conversion catalyst and the OSC material. In other words, although the catalyst layer has a double-layer structure in FIG. 2, the catalyst layer may be a single layer including at least one of the HC conversion catalyst and the OSC material, or may include three or more layers. When the HC conversion catalyst and the OSC material are supported on the honeycomb substrate, a noble metal such as Pt, Rh and Pd as the HC conversion catalyst or the oxide of Ce or Pr as the OSC material may be dispersed on a carrier having a high specific surface area. As for the carrier having a high specific surface area, powder of alumina ($Al_2O_3$), zirconia ($ZrO_2$), titania ($TiO_2$) or the like may be used.

With regard to a method of forming the catalyst layer, first, at least one of slurry containing a noble metal element such as Pt, Rh or Pd, slurry containing an oxide of a transition metal element of Ce or Pr, and slurry containing both the noble metal element and the transition metal element is prepared. Then, the slurry is provided on the monolithic substrate, followed by drying and baking so as to form the catalyst layer.

As for the HC generation catalyst 33A, the HC conversion catalyst and/or the OSC material may be granulated or pelletized. The granulated or pelletized HC conversion catalyst and OSC material may be filled in a container independently or by mixture, thereby arranging in the exhaust gas flow path 3.

In the HC generation catalyst 33A, the content of the HC conversion catalyst is preferably increased as closer to a surface having a large area with which exhaust gas comes into contact, intermittently or continuously. Namely, as shown in FIG. 2, the content of the HC conversion catalyst is preferably increased toward the exhaust gas flow path 33d from the honeycomb substrate 33a. An example of a method of increasing the content of the HC conversion catalyst toward the surface 33e may include a method of repeatedly coating a plurality of slurry having different contents of noble metal to form a plurality of catalyst layers, so as to increasingly contain more noble metal toward the surface 33e.

The amount of the HC conversion catalyst supported on the HC generation catalyst 33A, specifically the amount of noble metal such as Pt, Rh or Pd, is preferably 2.8 to 12.0 g/L. When the amount of the HC conversion catalyst is 2.8 to 12.0 g/L, a hydrocarbon contained in an exhaust gas can be decomposed to a lower hydrocarbon with C2 to C5 effectively by an oxidative dehydrogenation reaction, and also, reducing gas containing hydrogen ($H_2$) and carbon monoxide (CO) can be generated.

The HC conversion catalyst preferably generates hydrogen and carbon monoxide together with the lower hydrocarbon with C2 to C5 from the hydrocarbon in the exhaust gas by use of a small amount of oxygen ($O_2$), in which an oxygen concentration in the exhaust gas supplied to the HC generation catalyst 33A is approximately 0.8 to 1.5 vol %. In addition, the HC conversion catalyst is preferably activated at 200° C. or higher.

Figure 3:
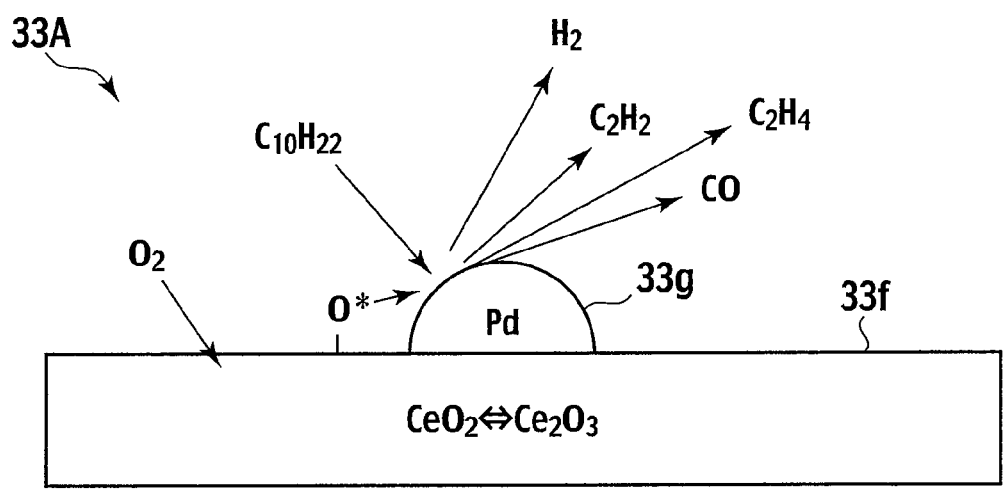
FIG. 3 is an explanatory view showing a mechanism of an oxidative dehydrogenation reaction in a HC generation catalyst.

FIG. 3 is an explanatory view showing a mechanism to generate acetylene and/or the lower hydrocarbon with C2 to C5 from the hydrocarbon (for example, decane ($C_{10}H_{22}$)) contained in the exhaust gas, due to an oxidative dehydrogenation reaction of the HC generation catalyst 33A. As shown in FIG. 3, the OSC material 33f (for example, $CeO_2$) included in the HC generation catalyst 33A absorbs oxygen in the exhaust gas when an air-fuel ratio is lean, and is oxidized to dicerium trioxide ($Ce_2O_3$). When the air-fuel ratio is stoichiometric or rich, the hydrocarbon in the exhaust gas, for example $C_{10}H_{22}$, deprives the OSC material ($Ce_2O_3$) 33f of oxygen (oxygen ion; O*). Moreover, $C_2H_2$ and the lower hydrocarbon with C2 to C5 (such as ethylene $C_2H_4$) are generated from $C_{10}H_{22}$ by an oxidative dehydrogenation reaction due to an action of an HC conversion catalyst 33g, and reducing gas containing $H_2$ and CO are generated together with such the lower hydrocarbon. Then, the reducing gas containing $H_2$ and CO generated in the HC generation catalyst 33A is supplied to the NOx purifying catalyst 34 provided downstream thereof. Note that, the technical scope of the present invention is not to be limited to the embodiment in which the effect is achieved by the above-described mechanism.

Examples of the lower hydrocarbon with C2 to C5 other than $C_2H_2$ generated in the HC generation catalyst 33A include a paraffinic hydrocarbon (such as methane, ethane, propane, butane, pentane), an olefinic hydrocarbon (such as ethylene, propylene, 1-butene, 2-butene, 1-pentene), and an acetylene hydrocarbon (such as propine, 1-butyne, 2-butyne, 1-pentine). Specifically, the content of the olefinic hydrocarbon with C2 to C5 having a multiple bond, especially a double bond, is preferably more than others among acetylene and the lower hydrocarbon with C2 to C5 other than $C_2H_2$ generated in the HC generation catalyst 33A. As the generation amount of the olefinic hydrocarbon with C2 to C5 having a double bond increases, the amount of hydrogen and carbon monoxide is generated more together with those hydrocarbons. Accordingly, a necessary and sufficient amount of a reducing agent can be supplied to the NOx purifying catalyst 34.

The amount of acetylene ($C_2H_2$) generated in the HC generation catalyst 33A is preferably 0.03 or more in a volume ratio with respect to the total hydrocarbon amount in the exhaust gas supplied to the NOx purifying catalyst 34 ($C_2H_2$ amount/total HC amount ≥0.03). When the $C_2H_2$ amount supplied to the NOx purifying catalyst 34 from the HC generation catalyst 33A is 0.03 or more with respect to the total HC amount in the exhaust gas, a necessary and sufficient amount of reducing gas that is effective to reduce nitrogen oxide can be supplied to the NOx purifying catalyst 34. Therefore, a NOx conversion rate to reduce nitrogen oxide to nitrogen can be improved.

The amount of acetylene supplied to the NOx purifying catalyst 34 from the HC generation catalyst 33A is preferably 0.17 or more in a volume ratio with respect to the total amount of a non-methane hydrocarbon (NMHC) in the exhaust gas supplied to the NOx purifying catalyst 34 ($C_2H_2$ amount/total NMHC amount ≥0.17). When the $C_2H_2$ amount is 0.17 or more with respect to the total NMHC amount in the exhaust gas in which methane with low optical activity is removed, reducing gas containing a necessary and sufficient amount of a reducing agent (such as $H_2$ and CO) to purify NOx can be supplied to the NOx purifying catalyst 34 while the amount of NMHC, which may easily cause photochemical smog, is reduced.

The amount of the hydrocarbon with C2 to C5 supplied to the NOx purifying catalyst 34 from the HC generation catalyst 33A is preferably 0.1 or more in a volume ratio with respect to the total hydrocarbon amount in the exhaust gas supplied to the NOx purifying catalyst 34 (amount of HC with C2 to C5/total HC amount ≥0.1). Due to the oxidative dehydrogenation reaction in the HC generation catalyst 33A, the generation amount of hydrogen increases, as the generation amount of the lower hydrocarbon with C2 to C5 increases. Therefore, NOx purification efficiency can be improved by supplying reducing gas containing a large amount of hydrogen to the NOx purifying catalyst 34.

The amount of the hydrocarbon with C2 to C5 other than $C_2H_2$ supplied to the NOx purifying catalyst 34 from the HC generation catalyst 33A is preferably 0.05 or more in a volume ratio with respect to the total amount of the hydrocarbon with C2 to C5 in the exhaust gas supplied to the NOx purifying catalyst 34 (amount of HC with C2 to C5 other than $C_2H_2$/total amount of HC with C2 to C5≥0.05). As the generation amount of the lower hydrocarbon with C2 to C5 other than $C_2H_2$ in the HC generation catalyst 33A increases, the NOx purification efficiency in the NOx purifying catalyst 34 tends to increase. In other words, the lower hydrocarbon with C2 to C5 other than $C_2H_2$ generated in the HC generation catalyst 33A is decomposed by a partial oxidative reaction or an oxidative dehydrogenation reaction in the NOx purifying catalyst 34, so as to generate a larger amount of hydrogen and carbon monoxide, which are to be used as a reducing agent effectively. Accordingly, purification efficiency of nitrogen oxide can be improved. In addition, the lower hydrocarbon with C2 to C5 has higher reactivity than the hydrocarbon with the carbon number of more than 5. Therefore, in the NOx purifying catalyst 34, the lower hydrocarbon with C2 to C5 per se functions as a reducing agent, so as to improve the purification efficiency of nitrogen oxide.

Among the lower hydrocarbon with C2 to C5 other than $C_2H_2$, as the amount of the olefinic hydrocarbon having a multiple bond, especially a double bond increases, the amount of hydrogen and carbon monoxide to be generated increases. Therefore, purification efficiency of nitrogen oxide can be improved. The amount of the olefinic hydrocarbon with C2 to C5 generated in the HC generation catalyst with respect to the total amount of the hydrocarbon with C2 to C5 in the exhaust gas supplied to the NOx purifying catalyst is preferably 0.6 or more in a volume ratio (amount of olefinic HC with C2 to C5/total amount of HC with C2 to C5≥0.6), more preferably 0.8 or more in a volume ratio (amount of olefinic HC with C2 to C5/total amount of HC with C2 to C5≥0.8).

According to the consideration by the inventors, it has been found that there is a mutual relation between the increased amount of the olefinic lower hydrocarbon with C2 to C5 generated in the HC generation catalyst and the NOx conversion rate to reduce nitrogen oxide to nitrogen. This may be because of the following reasons. As described above, the amount of the reducing agent ($H_2$, CO) generated together with the olefinic hydrocarbon in the HC generation catalyst increases so as to improve purification efficiency of nitrogen oxide in the NOx purifying catalyst. Moreover, due to the partial oxidative reaction or the oxidative dehydrogenation reaction in the NOx purifying catalyst 34, a larger amount of hydrogen and carbon monoxide is generated from the olefinic hydrocarbon with C2 to C5 generated in the HC generation catalyst. Accordingly, the NOx purification efficiency is improved by using such hydrogen and carbon monoxide as a reducing agent effectively.

The acetylene amount, the total hydrocarbon amount, the amount of the non-methane hydrocarbon, the amount of the hydrocarbon with C2 to C5, the amount of the hydrocarbon with C2 to C5 other than $C_2H_2$, and the amount of the olefinic hydrocarbon with C2 to C5 can be obtained by analyzing the exhaust gas using a gas chromatography-mass spectrometer. Namely, those amounts can be obtained by the gas chromatography-mass spectrometer connected with a thermal conductivity detector (TCD) and/or a hydrogen flame ionization detector (FID). More specifically, the peaks of the above-mentioned hydrocarbon are searched from the peaks detected by the thermal conductivity detector and/or the hydrogen flame ionization detector. Then, by comparing peak areas of each hydrocarbon, relative volume ratios of the above-mentioned hydrocarbon can be obtained.

Figure 4:
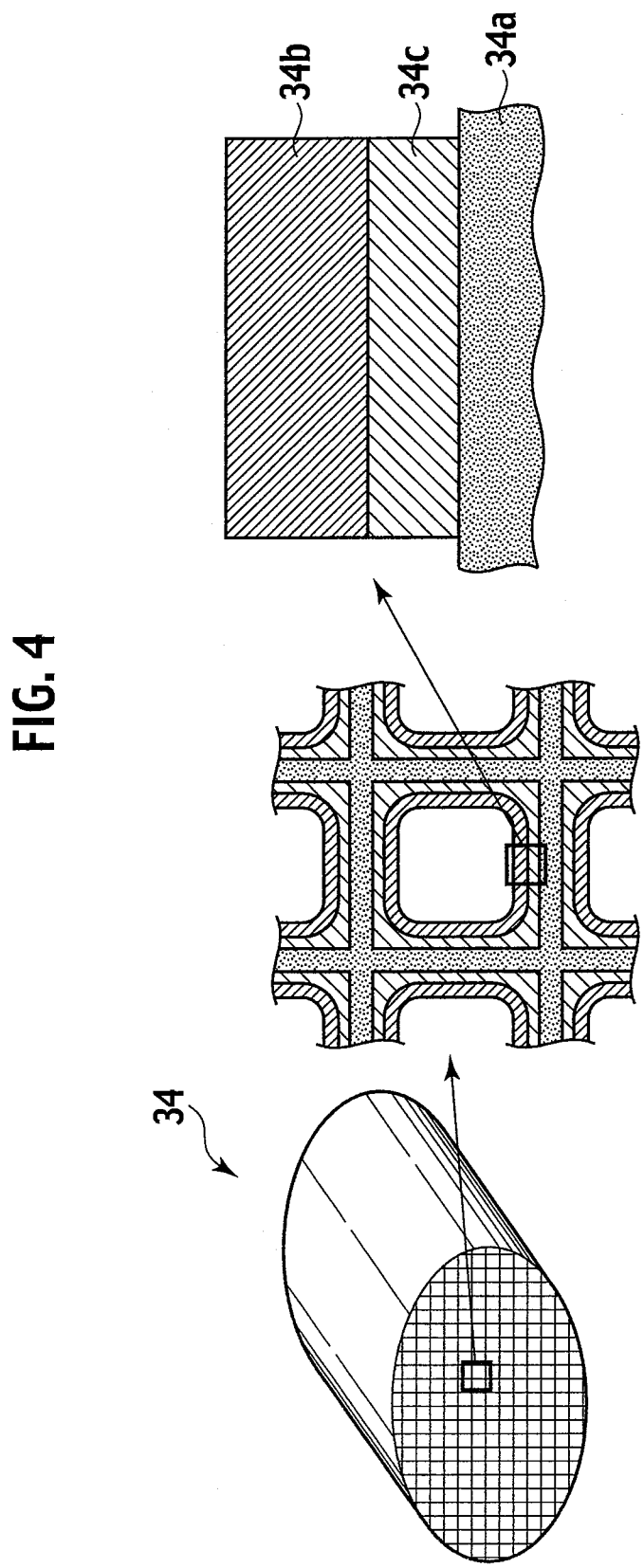
FIG. 4 is a perspective view and a partially enlarged view showing an example of a NOx purifying catalyst used in an exhaust gas purifying system according to an embodiment of the present invention.

FIG. 4 is a perspective view and a partially enlarged view showing an example of the NOx purifying catalyst 34 used in the exhaust gas purifying system. As shown in FIG. 4, the NOx purifying catalyst 34 to be used in this example includes a honeycomb substrate 34a on which a NOx trap catalyst layer 34b containing a NOx trap material and a purification catalyst is formed. The NOx purifying catalyst 34 of this example may further include a zeolite layer 34c as an HC trap material layer provided between the NOx trap catalyst layer 34b and the honeycomb substrate 34a.

The NOx trap material used in the NOx purifying catalyst 34 is not specifically limited as long as the NOx trap material can absorb and release nitrogen oxide according to variations of the air-fuel ratio of the internal combustion engine. As for the NOx trap material, oxides of alkali metal, alkaline-earth metal and rare earth elements, such as oxides of barium (Ba), magnesium (Mg), sodium (Na), cerium (Ce) and samarium (Sm) may be favorably used.

The purification catalyst used in the NOx purifying catalyst 34 is preferably a catalyst that promotes the generation of hydrogen and carbon monoxide together with the lower hydrocarbon with C2 to C5 by use of a small amount of oxygen in which an oxygen concentration in the exhaust gas is approximately 0.8 to 1.5 vol %. In such a case, the above-mentioned lower hydrocarbon is preferably generated by selectively and partially oxidizing or oxidatively dehydrogenating the hydrocarbon supplied to the NOx purifying catalyst 34. Hydrogen, carbon monoxide and the lower hydrocarbon are used as a reducing agent for released nitrogen oxide. Examples of the above-mentioned purification catalyst include platinum (Pt), rhodium (Rh), palladium (Pd), copper (Cu), iron (Fe), cobalt (Co), manganese (Mn) or zinc (Zn), and arbitrary mixtures of those.

The HC trap material used in the HC trap material layer is not particularly limited as long as the HC trap material can absorb and release a hydrocarbon. As for the HC trap material, at least one of MFI zeolite and β zeolite having a silica/alumina ratio of 20 or more to less than 60.

With regard to the NOx purifying catalyst 34 to purify nitrogen oxide, the HC trap material, the NOx trap material and the purification catalyst may be independently arranged in the exhaust gas flow path 3, which is not limited to the above example. Alternatively, the HC trap material and the purification catalyst may be combined so as to be provided as one layer, or the HC trap material, the NOx trap material and the purification catalyst may be combined so as to be provided as one layer. However, in order to sufficiently achieve the trap performance of the NOx trap material, the NOx trap material and the HC trap material are preferably arranged separately. Specifically, the HC trap material is preferably provided upstream in the exhaust gas flow path, and the NOx trap material is preferably provided downstream of the HC trap material. When the NOx trap material and the HC trap material are disposed on the honeycomb substrate, the HC trap material is preferably provided at a surface layer side, and the NOx trap material is preferably provided at an inner layer side close to the honeycomb substrate. The purification catalyst is preferably provided at an upstream side or a surface layer side so as to easily come into most contact with exhaust gas.

Figure 5:
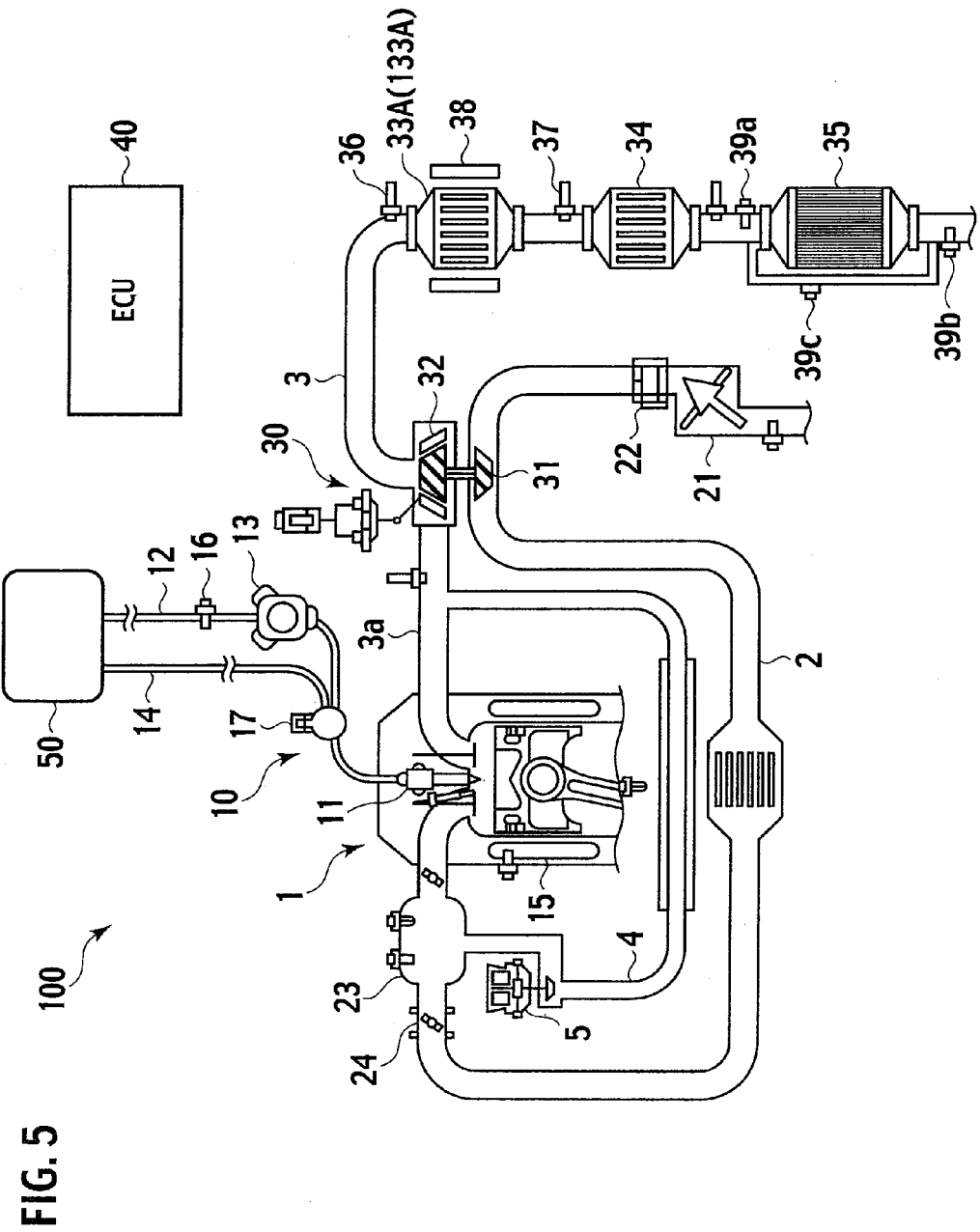
FIG. 5 is a schematic view showing an example of a constitution of an exhaust gas purifying system according to an embodiment of the present invention.

The following is a further detail of the exhaust gas purifying system of the present embodiment. FIG. 5 is a schematic configuration diagram showing the exhaust gas purifying system of a diesel engine equipped with a turbocharger according to the present embodiment. As shown in FIG. 5, an engine body 1 of the exhaust gas purifying system 100 includes a common-rail fuel injector. The common-rail fuel injector includes a common rail (accumulator) 10 and a fuel injection valve 11 provided in each cylinder. The common-rail fuel injector is supplied with fuel from a common-rail fuel injection system.

The common-rail fuel injection system includes a fuel supply passage 12 for supplying fuel from a fuel tank 50, a supply pump 13 provided in the fuel supply passage 12, and a fuel return passage 14 for a return fuel (spill fuel) that returns to the fuel tank 50 from the engine body 1. The fuel supplied to the engine body 1 from the fuel tank 50 via the fuel supply passage 12 is stored in the common rail 10 once after being pressurized by the supply pump 13. Then, the high pressure fuel in the common rail 10 is distributed to the fuel injection valve 11 of each cylinder to supply to the engine body 1 from the fuel injection valve 11. In the fuel injection valve 11 that injects fuel directly into a combustion chamber in the engine body 1, pilot injection, main injection, and post injection that inject fuel under a condition such that fuel is not burned in a cylinder of the engine body 1 are variably controlled. Moreover, fuel injection pressure from the fuel injection valve 11 is variably controlled by varying fuel pressure in the common rail 10.

In order to control the fuel pressure in the common rail 10, some of ejected fuel from the supply pump 13 is returned to the fuel supply passage 12 via an overflow passage (not shown in the figure) provided with a one-way valve. Specifically, a pressure control valve (not shown in the figure) to vary a flow path area of the overflow passage is provided. The pressure control valve varies the flow path area of the overflow passage according to a duty signal from an engine control unit (ECU) 40. As a result, the substantive amount of the ejected fuel from the supply pump 13 to the common rail 10 is adjusted, so that the fuel pressure in the common rail 10 is controlled.

An intake air passage 2 includes an air cleaner 21 provided upstream therein, and includes an air flow meter 22 as an intake airflow detector provided downstream of the air cleaner 21. The intake air passage 2 further includes a compressor 31 of a turbocharger 30 provided downstream of the air flow meter 22, and includes an intake air collector 23 provided downstream of the compressor 31. In addition, an intake throttle valve 24, which is controlled to open and close by a stepping motor-type actuator or the like, is provided between the compressor 31 and the intake air collector 23 in the intake air passage 2. The intake throttle valve 24 controls airflow introduced into the engine body 1 according to a degree of opening of the intake throttle valve 24.

An exhaust outlet passage 3a includes an exhaust turbine 32 of the turbocharger 30. The turbocharger 30 is turned by exhaust air from the engine body 1 so as to drive the compressor 31 of the turbocharger 30 provided in the intake air passage 2. The exhaust outlet passage 3a further includes an EGR passage 4 that is diverged from a portion between the engine body 1 and the exhaust turbine 32 so as to be connected to the intake air passage 2. The EGR passage 4 includes an EGR valve 5, which is controlled to open and close by a stepping motor-type actuator or the like, so that a degree of opening of the EGR valve 5 is controlled continuously. According to the degree of opening of the EGR valve 5, the amount of exhaust air that flows back to an intake side, that is, the EGR amount introduced into the engine body 1 is controlled.

The HC generation catalyst 33A is provided downstream of the exhaust turbine 32 in the exhaust gas flow path 3. The NOx purifying catalyst 34 that absorbs and releases nitrogen oxide (NOx) in an exhaust gas is provided downstream of the HC generation catalyst 33A in the exhaust gas flow path 3. In addition, a diesel particulate filter (DPF) 35, which collects particulate matter (PM) in the exhaust gas, is provided downstream of the NOx purifying catalyst 34.

Each inlet port of the HC generation catalyst 33A and the NOx purifying catalyst 34 in the exhaust gas flow path 3 is provided with air-fuel ratio sensors 36 and 37 that are detectors to detect an air-fuel ratio (excess air ratio) in an exhaust gas. Each of the air-fuel ratio sensors 36 and 37 includes an oxygen ion conducting solid electrolyte, so that the air-fuel ratio sensors 36 and 37 detect an oxygen concentration in the exhaust gas and obtain the air-fuel ratio (excess air ratio) in the exhaust gas from the detected oxygen concentration. Note that, an excess air ratio ($\lambda$) in exhaust air represents a value obtained by dividing an air-fuel ratio in an exhaust gas by a stoichiometric air-fuel ratio (14.7). As the value increases, the air-fuel ratio becomes lean. On the other hand, as the value decreases, the air-fuel ratio becomes rich.

As described above, the exhaust gas purifying system 100 is provided with the air-fuel ratio sensors 36 and 37, and the air flow meter 22 that detects intake airflow. In addition, the exhaust gas purifying system 100 is provided with sensors to detect various conditions, such as a rotational speed sensor (not shown in the figure) that detects a rotational speed of the engine, an accelerator opening degree sensor (not shown in the figure) that detects an accelerator opening degree, and a water temperature sensor 15 that detects a coolant water temperature of the engine. The exhaust gas purifying system 100 is further provided with a pressure sensor 16 and a temperature sensor 17 that detect fuel pressure and temperature in the common rail 10, respectively, as sensors to detect conditions of the common rails 10. Further, temperature sensors 39a and 39b are provided at an inlet side and an outlet side of the DPF 35, respectively, and a differential pressure sensor 39c is provided to measure a pressure difference between the inlet side and the outlet side of the DPF 35.

Although not shown in the figure, additional sensors, which measure the hydrocarbon amount, the acetylene amount, the amount of the hydrocarbon with the carbon number of 2 to 5, and the amount of the olefinic hydrocarbon with C2 to C5 in the exhaust gas, may be provided between the HC generation catalyst 33A and the NOx purifying catalyst 34. In addition, another sensor may be provided downstream of the NOx purifying catalyst 34 to measure the amount of hydrogen in the exhaust gas emitted from the NOx purifying catalyst 34.

Various input signals are transmitted to the engine control unit (ECU) 40 from each sensor. For example, input signals such as an air flow meter signal for detecting intake airflow, a water temperature sensor signal, a signal of a crank angle sensor for detecting a crank angle, a signal of a crank angle sensor for determining a cylinder, a signal of a pressure sensor for detecting fuel pressure of a common rail, a signal of a temperature sensor for detecting fuel temperature, a signal of an accelerator opening degree sensor for detecting a pressing degree of an accelerator pedal corresponding to load, and a signal of an air-fuel ratio sensor, are transmitted to the ECU 40. The ECU 40 determines fuel injection pressure according to the transmitted detection signal from each sensor, and specifies the fuel injection amount and injection timing so as to control the drive of the fuel injection valve 11.

The fuel injection valve 11, which is controlled to open and close electronically by on-off signals from the ECU 40, injects fuel into a fuel injection chamber by the on-signal, and stops injection by the off-signal. As a time of the on-signal applied to the fuel injection valve 11 is longer, the fuel injection amount increases. In addition, as the fuel pressure in the common rail 10 is higher, the amount of fuel injection increases. The timing of fuel injection is arbitrarily determined according to the signals, such as the signal of the crank angle sensor for detecting a crank angle and the signal of the crank angle sensor for determining a cylinder, transmitted to the ECU 40. Then, fuel injection from the fuel injection valve 11 is executed under the control of the ECU 40 at an arbitrary timing of injection such as pilot injection, main injection and post injection.

In the exhaust gas purifying system, a device for supplying fuel to exhaust gas (fuel gas supplying device) is preferably provided in order to efficiently generate reducing gas containing hydrogen and carbon monoxide as a NOx reducing agent from the exhaust gas. An example of the fuel gas supplying device for supplying fuel gas to the HC generation catalyst 33A includes the fuel injection valve 11 that is controlled by the ECU 40 and the like. Specifically, the ECU 40 increases the fuel injection amount injected from the fuel injection valve 11 as a fuel gas supplying device when, for example, a rich spike control is operated. In addition, the ECU 40 operates post injection after main injection, which injects fuel at around a top dead center of a piston of the engine body 1. The post injection represents injection to inject fuel at a crank angle such that fuel is not burned in a cylinder of the engine body 1. Thus, the fuel injection amount and the timing of injection of fuel injected from the fuel injection valve 11 are controlled so as to increase the fuel injection amount and operate the post injection. Accordingly, fuel gas is supplied to the HC generation catalyst 33A.

In the exhaust gas purifying system, the rich spike control is operated by reducing the excess air ratio ($\lambda$) of the exhaust gas from the engine body 1 to 1.0 or less. Specifically, in order to reduce the excess air ratio ($\lambda$) of the exhaust gas to 1.0 or less so as to be rich, the ECU 40 controls the intake throttle valve 24 and the EGR valve 25 to reduce the degree of opening. In addition, fuel is injected from the fuel injection valve 11 at the injection timings of the pilot injection, the main injection and the post injection, so that exhaust gas becomes rich. Then, nitrogen oxide, which is absorbed in the NOx purifying catalyst 34 under the condition of the lean fuel operation in which the excess air ratio (λ) is high, is released from the NOx purifying catalyst 34 at the time of the rich spike control operation.

When the rich spike control is operated, specifically when the excess air ratio (λ) is 1.0 or less, preferably 0.75 to 0.83, the oxygen concentration in the exhaust gas is controlled to be 0.8 to 1.5 vol % by an oxygen concentration control device. In this case, the oxygen concentration in the exhaust gas is preferably controlled to be 1.1 to 1.4 vol %, more preferably 1.1 to 1.2 vol %. When the oxygen concentration in the exhaust gas introduced to the HC generation catalyst 33A is as low as 0.8 to 1.5 vol % at the time of the rich spike control operation, the reaction shown in FIG. 3 is easily occurred as described above. In other words, since an unburned hydrocarbon in the exhaust gas deprives oxygen from the OSC material in the HC generation catalyst 33A of oxygen, the dehydrogenation reaction is easily caused in the HC generation catalyst 33A due to the action of the HC conversion catalyst. Further, hydrogen is easily generated in addition to the generation of acetylene ($C_2H_2$) and/or the hydrocarbon with the carbon number of 2 to 5 other than acetylene. Therefore, when the oxide concentration in the exhaust gas is 0.8 to 1.5 vol % at the time of the rich spike control operation, a sufficient amount of hydrogen necessary to reduce nitrogen oxide in the HC generation catalyst 33A can be generated. Moreover, the reducing gas containing a large amount of such hydrogen can be supplied to the NOx purifying catalyst 34.

Examples of the oxygen concentration control device include the intake throttle valve 24 and the EGR valve 25 of which the respective degrees of opening are controlled by the ECU 40. The amount of air introduced to the engine body 1 is adjusted by controlling the degrees of opening of the intake throttle valve 24 and the EGR valve 25. Therefore, the oxygen concentration of the exhaust gas supplied to the HC generation catalyst 33A can be controlled. As a device to operate the oxygen concentration control device, the device based on a prediction control, which is disclosed in Japanese Patent No. 3918402, is effectively utilized.

Preferably, a temperature control device to control a temperature of the HC generation catalyst 33A to keep at 200° C. or more is provided adjacent to the HC generation catalyst 33A. Although the temperature control device is not particularly limited, examples of the temperature control device include the temperature sensor and a heater 38 provided adjacent to the HC generation catalyst 33A. A device including the temperature sensor, various heaters and, as necessary, CPU is used to control the HC generation catalyst 33A to keep at 200° C. or more when, for example, the rich spike control is operated. Oxygen absorbed in the OSC material in the HC generation catalyst 33A is easily released from the HC generation catalyst 33A by being heated to a release temperature, typically 200 to 250° C. or more. If oxygen is easily released from the HC generation catalyst 33A when nitrogen oxide is reduced in the NOx purifying catalyst 34 (at the time of the rich spike control), the dehydrogenation reaction is promoted in the HC generation catalyst 33A, and therefore, hydrogen is easily generated.

Figure 6:
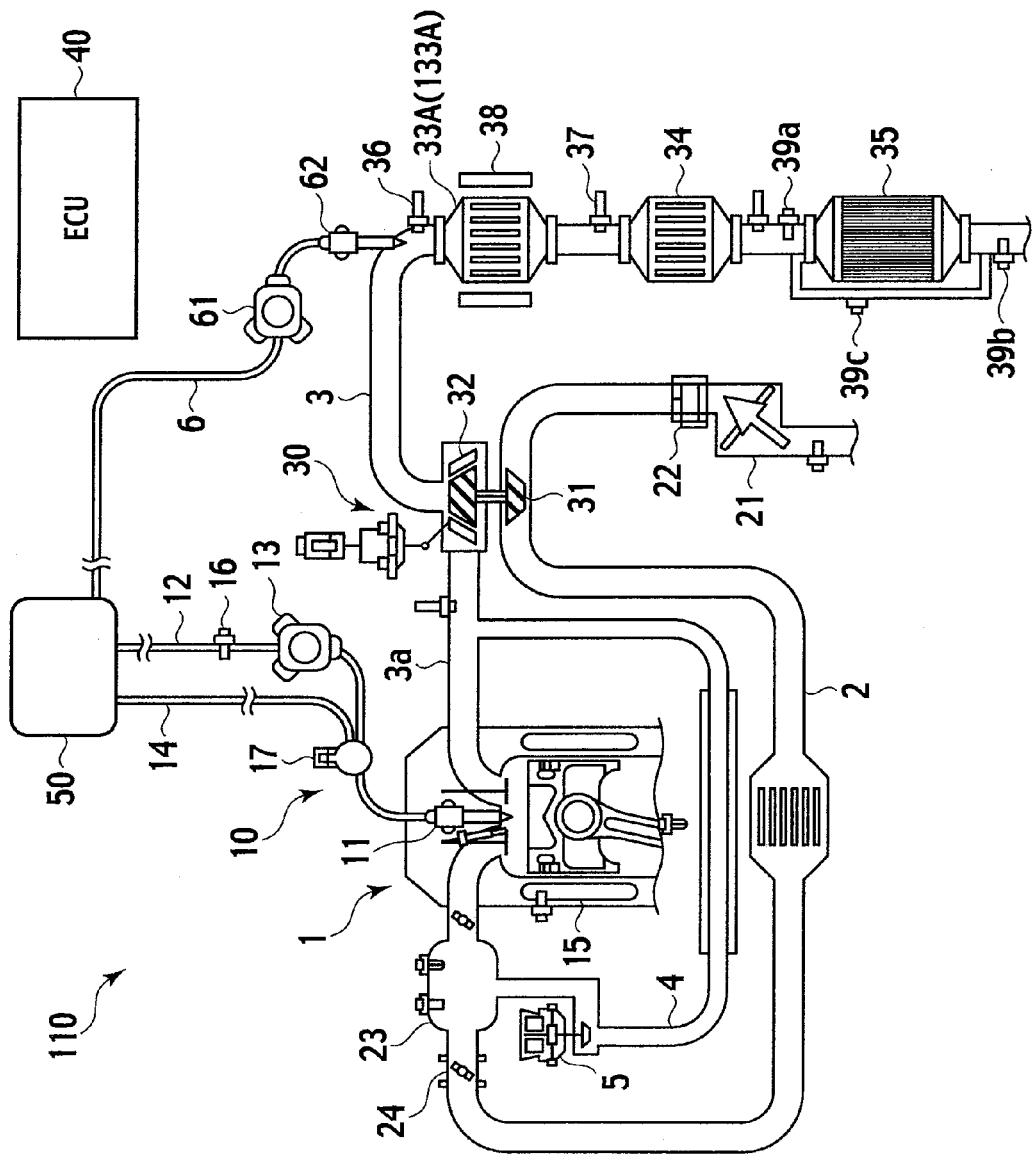
FIG. 6 is a schematic view showing another example of a constitution of an exhaust gas purifying system according to an embodiment of the present invention.

FIG. 6 is a schematic configuration diagram showing another example of the exhaust gas purifying system of the diesel engine equipped with the turbocharger according to the present embodiment. The members in FIG. 6 similar to those in FIG. 5 are indicated by the same numerals, and the explanations thereof are not repeated. As shown in FIG. 6, an exhaust gas purifying system 110 of this example includes a fuel supplying system for supplying fuel directly to an upstream portion of the HC generation catalyst 33A in the exhaust gas flow path 3 from the fuel tank 50. The fuel supplying system includes a second fuel supply passage 6 for supplying the fuel directly to the upstream portion of the HC generation catalyst 33A (inlet side of the HC generation catalyst 33A) in the exhaust gas flow path 3 from the fuel tank 50, a second supply pump 61, and an injector 62. This fuel supplying system is a fuel gas supplying device for supplying fuel gas to the HC generation catalyst 33A.

Specifically, under the control of the ECU 40 and the like, the fuel supplying system injects the fuel directly to the upstream side of the HC generation catalyst 33A in the exhaust gas flow path 3 from the injector 62 via the second supply pump 61 when, for example, the rich spike control is operated. The second supply pump 61 adjusts the substantive amount of the fuel ejection from the injector 62 to the exhaust gas flow path 3. Thus, the fuel gas can be supplied to the HC generation catalyst 33A by injecting the fuel directly to the upstream side of the HC generation catalyst 33A in the exhaust gas flow path 3 from the injector 62.

As described above, the exhaust gas purifying system according to the present embodiment can be favorably used for a diesel engine using light oil as fuel containing a large amount of the hydrocarbon with a larger carbon number. Moreover, the exhaust gas purifying system according to the present embodiment can be favorably used for a lean-burn engine and a direct-injection engine using gasoline as fuel.

(Exhaust Gas Purifying Method)

The following is a description of a method of purifying exhaust gas using the exhaust gas purifying system according to the present embodiment. In the exhaust gas purifying system according to the present embodiment, when the air-fuel ratio is lean, oxygen is absorbed in the HC conversion catalyst layer 33b containing the OSC material in the HC generation catalyst 33A, and nitrogen oxide (NOx) is absorbed in the NOx trap material in the NOx purifying catalyst 34. When the NOx purifying catalyst 34 includes the HC trap material layer 34c, the lower hydrocarbon with C2 to C5 supplied from the HC generation catalyst 33A is absorbed in the HC trap material layer 34c when an exhaust gas temperature is low.

On the other hand, when the air-fuel ratio is stoichiometric or rich in the exhaust gas purifying system of this example, the unburned hydrocarbon in the exhaust gas deprives the OSC material of oxygen absorbed in the OSC material in the HC generation catalyst 33A. Then, due to the oxidative dehydrogenation reaction of the HC conversion catalyst, reducing gas containing hydrogen ($H_2$) and carbon monoxide (CO) is generated together with the lower hydrocarbon with C2 to C5, so as to supply to the NOx purifying catalyst 34. When the air-fuel ratio is stoichiometric or rich in the NOx purifying catalyst 34, nitrogen oxide (NOx) is released from the NOx trap material. Then, the reducing gas is supplied from the HC generation catalyst 33A, thereby reducing NOx efficiently.

As described above, when the air-fuel ratio is stoichiometric or rich, specifically, when the excess air ratio (λ) is 1.0 or less, preferably 0.75 to 0.83, the oxygen concentration in the exhaust gas is controlled to be 0.8 to 1.5 vol %. In this case, the oxygen concentration in the exhaust gas is preferably controlled to be 1.1 to 1.4 vol %, more preferably 1.1 to 1.2 vol %. When the oxygen concentration in the exhaust gas introduced to the HC generation catalyst 33A is as low as 0.8 to 1.5 vol % when the air-fuel ratio is stoichiometric or rich, the unburned hydrocarbon in the exhaust gas deprives of oxygen absorbed in the OSC material. Then, due to the oxidative dehydrogenation reaction, reducing gas such as $H_2$ is easily generated together with the lower hydrocarbon with C2 to C5. Accordingly, a sufficient amount of the reducing gas containing hydrogen and the like necessary to reduce NOx released from the NOx trap material is easily supplied to the NOx purifying catalyst 34 from the HC generation catalyst 33A if the oxygen concentration in the exhaust gas is within the above-mentioned range when the air-fuel ratio is stoichiometric or rich.

Also, as described above, oxygen absorbed in the OSC material in the HC generation catalyst 33A is easily released from the OSC material by being heated to a release temperature, typically 200 to 250° C. or more. If the oxidative dehydrogenation reaction or cracking of the hydrocarbon is promoted in the HC generation catalyst 33A when reducing NOx in the NOx purifying catalyst 34, the amount of the reducing agent such as $H_2$ supplied to the NOx purifying catalyst 34 is increased, thereby improving the NOx purification efficiency. Consequently, when the air-fuel ratio is stoichiometric or rich in which NOx is reduced in the NOx purifying catalyst 34, the HC generation catalyst 33A is preferably controlled to be at 200° C. or more.

When a catalyst including the HC trap material layer 34c is used as the NOx purifying catalyst 34, the lower hydrocarbon with C2 to C5 supplied from the HC generation catalyst 33A can be absorbed in the HC trap material layer 34c when the air-fuel ratio is lean. Namely, since a temperature of the NOx purifying catalyst 34 per se is decreased when the air-fuel ratio is lean, such the lower hydrocarbon can be absorbed in the HC trap material layer 34c. In addition, since the temperature of the NOx purifying catalyst 34 per se is increased when the air-fuel ratio is stoichiometric or rich, the lower hydrocarbon with C2 to C5 absorbed in the HC trap material layer 34c in the NOx purifying catalyst 34 can be released. Further, as described above, the oxygen concentration in the exhaust gas is controlled to be 0.8 to 1.5 vol % by the oxygen concentration control device when the air-fuel ratio is stoichiometric or rich. Under the atmosphere in which the oxygen concentration is controlled, the above-mentioned the lower hydrocarbon released from the HC trap catalyst 34c generates the reducing agent such as $H_2$ due to the partial oxidative reaction or the oxidative dehydrogenation reaction in the NOx purifying catalyst 34, so as to improve the NOx purification efficiency.

According to the present embodiment, the HC trap material layer is provided in the NOx purifying catalyst 34, as well as the HC generation catalyst 33A, which generates acetylene and the lower hydrocarbon with C2 to C5 from the unburned hydrocarbon in the exhaust gas, is provided upstream of the NOx purifying catalyst 34. Accordingly, the reducing agent such as $H_2$ is generated so as to improve the NOx purification efficiency by effectively using the lower hydrocarbon with C2 to C5 supplied from the HC generation catalyst 33A.

The following is a further description of the present embodiment referring to examples and a comparative example. However, the present invention is not limited to these examples.

Example 1

Manufacture of HC Conversion Catalyst Slurry A

γ-alumina powder was impregnated with an aqueous solution of rhodium nitrate ($Rh(NO_3)_3$) with a rhodium concentration of 6%, and dried at 120° C. for a day to extract water, followed by baking at 450° C. for 1 hour. Thus, HC conversion catalyst powder a having the rhodium supporting amount of 1% was obtained. Then, 207 g of the catalyst powder a, 603 g of γ-alumina, 90 g of alumina sol and 900 g of water were put into a magnetic ball mill, mixed and milled to have an average particle diameter of 3.8 μm, thereby obtaining HC conversion catalyst slurry A.

<Manufacture of HC Conversion Catalyst Slurry B Containing OSC Material>

Composite oxide powder of cerium:praseodymium=0.7:0.3 in a molar ratio was impregnated with an aqueous solution of palladium nitrate ($Pd(NO_3)_3$) with a palladium concentration of 6%, and dried at 120° C. for a day to extract water, followed by baking at 600° C. Thus, HC conversion catalyst powder b containing an OSC material and having the palladium supporting amount of 4% was obtained. Then, 578 g of the catalyst powder b, 232 g of the composite oxide powder of cerium:praseodymium=0.7:0.3 in a molar ratio, 90 g of alumina sol and 900 g of water were put into a magnetic ball mill, mixed and milled to have an average particle diameter of 3.8 μm, thereby obtaining HC conversion catalyst slurry B containing the OSC material.

<Manufacture of HC Generation Catalyst 1>

A cordierite honeycomb monolithic substrate (0.92 L, 400 cpsi) was coated with the HC conversion catalyst slurry A, followed by removing redundant slurry adhered to cells by compressed airflow. Then, the monolithic substrate provided with the slurry was dried at 130° C., followed by baking at 450° C. for 1 hour. Thus, an HC conversion catalyst layer A having the coating amount of 100 g/L was formed on the honeycomb substrate.

Nest, the HC conversion catalyst layer A was coated with the HC conversion catalyst slurry B containing the OSC material, followed by removing redundant slurry in the cells by compressed airflow in the same manner as the HC conversion catalyst slurry A. Then, the monolithic substrate provided with the slurry was dried at 130° C., followed by baking at 450° C. for 1 hour. Thus, an HC conversion catalyst layer B containing the OSC material and having the coating amount of 100 g/L was formed on the HC conversion catalyst layer A. Accordingly, a HC generation catalyst 1 including the HC conversion catalyst layer A and the HC conversion catalyst layer B containing the OSC material formed on the honeycomb substrate was obtained. The rhodium supporting amount in the HC conversion catalyst layer A supported on the HC generation catalyst 1 was 0.23 g/L. The palladium supporting amount in the HC conversion catalyst layer B containing the OSC material was 2.57 g/L.

Example 2

Manufacture of HC Conversion Catalyst Slurry C

γ-alumina powder was impregnated with an aqueous solution of rhodium nitrate ($Rh(NO_3)_3$) with a rhodium concentration of 6%, and dried at 120° C. for a day to extract water, followed by baking at 450° C. for 1 hour. Thus, HC conversion catalyst powder c having the rhodium supporting amount of 4% was obtained. Then, 207 g of the catalyst powder c, 603 g of γ-alumina, 90 g of alumina sol and 900 g of water were put into a magnetic ball mill, mixed and milled to have an average particle diameter of 3.8 μm, thereby obtaining HC conversion catalyst slurry C.

<Manufacture of HC Conversion Catalyst Slurry D Containing OSC Material>

Composite oxide powder of cerium:praseodymium=0.7:0.3 in a molar ratio was impregnated with an aqueous solution of palladium nitrate ($Pd(NO_3)_3$) with a palladium concentration of 6%, and dried at 120° C. for a day to extract water, followed by baking at 600° C. Thus, HC conversion catalyst powder d containing an OSC material and having the palladium supporting amount of 16% was obtained. Then, 578 g of the catalyst powder d, 232 g of the composite oxide powder of cerium:praseodymium=0.7:0.3 in a molar ratio, 90 g of alumina sol and 900 g of water were put into a magnetic ball mill, mixed and milled to have an average particle diameter of 3.8 μm, thereby obtaining HC conversion catalyst slurry D containing the OSC material.

<Manufacture of HC Generation Catalyst 2>

A cordierite honeycomb monolithic substrate (0.92 L, 400 cpsi) was coated with the HC conversion catalyst slurry C, followed by removing redundant slurry adhered to cells by compressed airflow. Then, the monolithic substrate provided with the slurry was dried at 130° C., followed by baking at 450° C. for 1 hour. Thus, an HC conversion catalyst layer C having the coating amount of 100 g/L was formed on the honeycomb substrate.

Next, the HC conversion catalyst layer C was coated with the HC conversion catalyst slurry D containing the OSC material, followed by removing redundant slurry in the cells by compressed airflow in the same manner as the HC conversion catalyst slurry C. Then, the monolithic substrate provided with the slurry was dried at 130° C., followed by baking at 450° C. for 1 hour. Thus, an HC conversion catalyst layer D containing the OSC material and having the coating amount of 100 g/L was formed on the HC conversion catalyst layer C. Accordingly, a HC generation catalyst 2 including the HC conversion catalyst layer C and the HC conversion catalyst layer D containing the OSC material formed on the honeycomb substrate was obtained. The rhodium supporting amount in the HC conversion catalyst layer C supported on the HC generation catalyst 2 was 0.95 g/L. The palladium supporting amount in the HC conversion catalyst layer D containing the OSC material was 10.3 g/L.

<Manufacture of NOx Purifying Catalyst>

First, alumina was put into a mixed aqueous solution of a cerium acetate ($Ce(CH_3CO_2)_3$) aqueous solution and barium acetate ($Ba(CH_3CO_2)_2$), and stirred for approximately 1 hour at room temperature. Then, the mixture was dried at 120° C. for a day to extract water, followed by baking at 600° C. for approximately 1 hour in an atmosphere so as to obtain baked powder. The baked powder was impregnated with a tetraamine platinum hydroxide salt solution (pH=10.5) with a platinum concentration of 2%, and dried at 120° C. for a day to extract water, followed by baking at 450° C. for 1 hour. Thus, catalyst powder e having the platinum supporting amount of 1%, the barium supporting amount of 8% as barium oxide (BaO), and the cerium supporting amount of 20% as cerium oxide ($CeO_2$) was obtained.

Next, alumina was put into an aqueous solution of zirconium acetate ($Zr(CH_3CO_2)_4$), and stirred for approximately 1 hour at room temperature. Then, the mixture was dried at 120° C. for a day to extract water, followed by baking at 900° C. for 1 hour in an atmosphere so as to obtain baked powder. The baked powder was impregnated with an aqueous solution of rhodium nitrate ($Rh(NO_3)_3$) with a rhodium concentration of 6%, and dried at 120° C. for a day to extract water, followed by baking at 450° C. for 1 hour. Thus, catalyst powder f having the rhodium supporting amount of 2% and the zirconium supporting amount of 3% was obtained.

In addition, alumina was put into a mixed aqueous solution of a cerium acetate ($Ce(CH_3CO_2)_3$) aqueous solution and barium acetate ($Ba(CH_3CO_2)_2$), and stirred for approximately 1 hour at room temperature. Then, the mixture was dried at 120° C. for a day to extract water, followed by baking at 600° C. for approximately 1 hour in an atmosphere so as to obtain baked powder. The baked powder was impregnated with a tetraamine platinum hydroxide salt solution (pH=10.5) with a platinum concentration of 2%, and dried at 120° C. for a day to extract water, followed by baking at 450° C. for 1 hour. Thus, catalyst powder g having the platinum supporting amount of 3.5%, the barium supporting amount of 8% as barium oxide (BaO), and the cerium supporting amount of 20% as cerium oxide ($CeO_2$) was obtained.

555 g of the catalyst powder e, 25 g of alumina, 230 g of β-zeolite, 90 g of alumina sol and 900 g of water were put into a magnetic ball mill, mixed and milled to have an average particle diameter of 3.2 μm, thereby obtaining catalyst slurry E. Then, 317 g of the catalyst powder f, 454 g of the catalyst powder g, 38 g of alumina, 90 g of alumina sol and 900 g of water were put into a magnetic ball mill, mixed and milled to have an average particle diameter of 3.0 μm, thereby obtaining catalyst slurry F.

In addition, 720 g of proton-type β-zeolite in which a silica/alumina ratio was approximately 25, 180 g of silica sol and 900 g of water were put into a magnetic alumina ball mill, mixed and milled to have an average particle diameter of 3.8 μm, thereby obtaining zeolite slurry H.

Next, a cordierite honeycomb monolithic substrate (1.2 L, 400 cpsi) was coated with the zeolite slurry H, followed by removing redundant slurry adhered to cells by compressed airflow. Then, the monolithic substrate provided with the slurry was dried at 130° C., followed by baking at 450° C. for 1 hour. Thus, a zeolite layer (a first layer: the HC trap material) having the coating amount of 80 g/L was formed on the honeycomb substrate.

Next, the zeolite layer was coated with the catalyst slurry E, followed by removing redundant slurry in the cells by compressed airflow in the same manner as the zeolite slurry H. Then, the monolithic substrate provided with the slurry was dried at 130° C., followed by baking at 450° C. for 1 hour. Thus, a catalyst layer (a second layer: a coexisting layer of the HC trap material and the NOx trap catalyst) having the coating amount of 220 g/L was formed on the zeolite layer.

Further, the catalyst layer was coated with the catalyst slurry F, followed by removing redundant slurry in the cells by compressed airflow in the same manner as the catalyst slurry E. Then, the monolithic substrate provided with the slurry was dried at 130° C., followed by baking at 450° C. for 1 hour. Thus, a catalyst layer (a third layer: a NOx trap catalyst layer) having the coating amount of 100 g/L was formed on the catalyst layer (the second layer).

<Formulation of Exhaust Gas Purifying System and Performance Evaluation I>

As shown in FIG. 5, the HC generation catalyst 33A (the HC generation catalyst 1 of Example 1 or the HC generation catalyst 2 of Example 2) was installed upstream in the exhaust gas flow path 3 of an in-line four cylinder direct-injection diesel engine with a displacement of 2500 cc manufactured by NISSAN MOTOR CO., LTD., so as to configure an exhaust gas purifying system. In addition, the NOx purifying catalyst 34 was installed downstream of the HC generation catalyst 33A. Meanwhile, in Comparative Example 1, only the NOx purifying catalyst 34 was installed in the exhaust gas flow path 3 without installing the HC generation catalyst 33A, so as to configure an exhaust gas purifying system.

Next, an operation to drive each of the exhaust gas purifying systems of Example 1 and 2 and Comparative Example 1 in a lean condition (A/F=30) for 40 seconds, followed by driving in a rich condition (A/F=11.7) for 2 seconds was repeated. Then, the $C_2H_2$ amount with respect to the total HC amount in the exhaust gas supplied to the NOx purifying catalyst 34 from the HC generation catalyst 33A within the rich range was measured by a gas chromatography-mass spectrometer. In the gas chromatography-mass spectrometer, both TCD and FID were used as a detector. In addition, a NOx conversion rate of the NOx purifying catalyst 34 within the rich range was obtained by measuring NOx concentrations at the inlet side and the outlet side of the NOx purifying catalyst 34 by use of a chemiluminescent NOx analyzer. The result is shown in FIG. 7.

Figure 8:
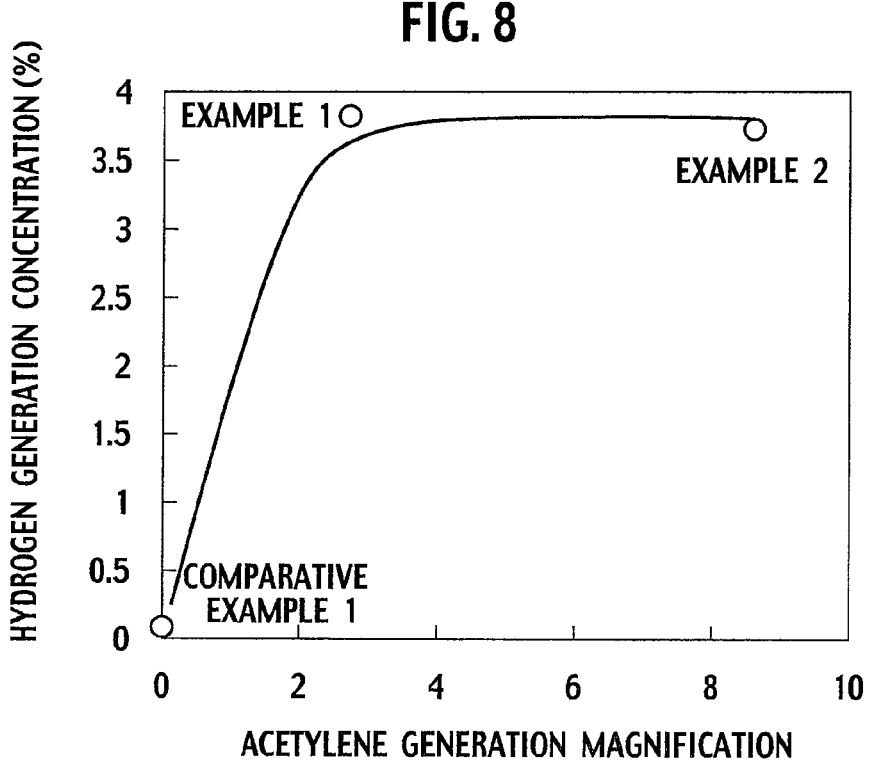
FIG. 8 is a graph showing a hydrogen generation concentration for an acetylene generation magnification in a HC generation catalyst.

In addition, a hydrogen generation concentration in the HC generation catalyst with respect to an acetylene generation magnification was obtained by the gas chromatography-mass spectrometer. The result is shown in FIG. 8. Further, the acetylene amount with respect to the total amount of the non-methane hydrocarbon in the exhaust gas supplied to the NOx purifying catalyst 34 from the HC generation catalyst 33A was obtained in the same manner as described above. The result is shown in FIG. 9.

The oxygen concentration in the exhaust gas during rich spike was controlled to be 0.8 to 1.2 vol % according to the method disclosed in Japanese Patent No. 3918402. The fuel to be used was commercially available JIS (Japanese Industrial Standards) 2 light oil. The inlet temperature of the HC generation catalyst 33A was set at 220° C.

Figure 7:
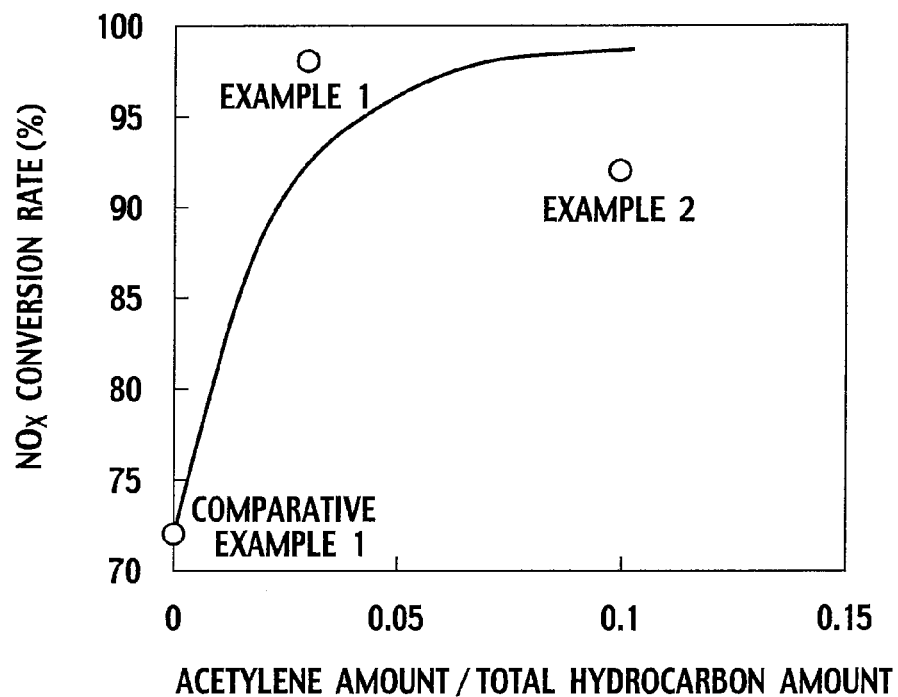
FIG. 7 is a graph showing a NOx conversion rate for an acetylene amount/a total hydrocarbon amount in exhaust gas supplied to a NOx purifying catalyst from a HC generation catalyst.

As shown in FIG. 7, it was recognized that the NOx conversion rate (reduction rate) in the NOx purifying catalyst was higher, as the content ratio of acetylene supplied to the NOx purifying catalyst from the HC generation catalyst was higher. Especially, when the acetylene amount supplied from the HC generation catalyst 33A was 0.025 or more with respect to the total hydrocarbon amount contained in the exhaust gas ($C_2H_2$ amount/total HC amount ≥0.025), a high NOx conversion rate of 90% or more could be achieved. This is because acetylene and hydrogen and the like were generated from the hydrocarbon in the exhaust gas because of an oxidative dehydrogenation reaction in the HC generation catalyst and a condensation associated therewith when the air-fuel ratio was shifted from a lean condition to a rich condition. Thus, a sufficient amount of a reducing agent necessary to reduce nitrogen oxide was supplied to the NOx purifying catalyst 34. As shown in FIG. 8, due to the oxidative dehydrogenation reaction in the HC generation catalyst and the condensation associated therewith, as the acetylene generation magnification was higher, the hydrogen generation concentration was higher. Accordingly, it was recognized that the necessary and sufficient amount of the reducing agent was supplied to the NOx purifying catalyst.

Figure 9:
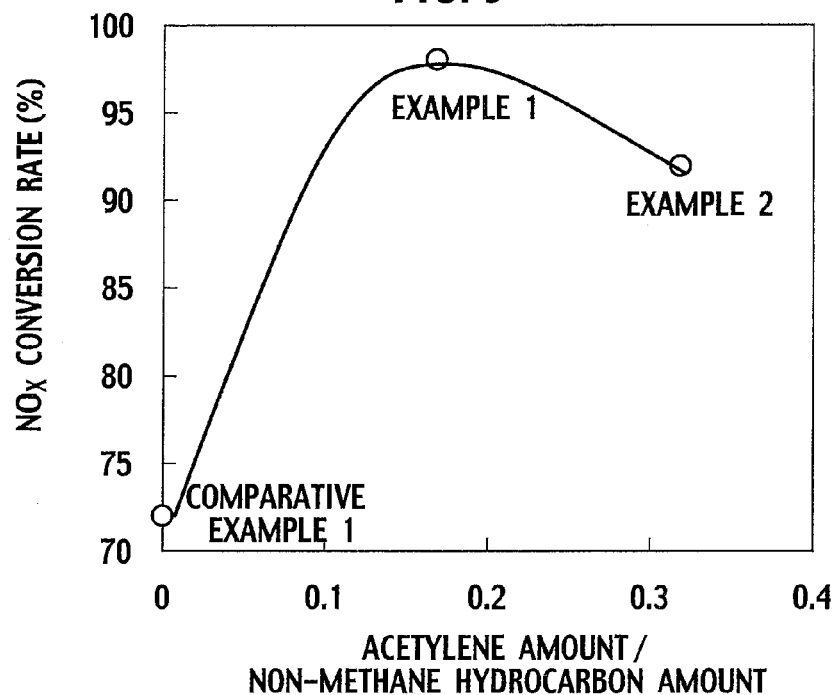
FIG. 9 is a graph showing a NOx conversion rate for an acetylene amount/a total NMHC amount in exhaust gas supplied to a NOx purifying catalyst from a HC generation catalyst.

Moreover, as shown in FIG. 9, when the acetylene amount supplied to the NOx purifying catalyst from the HC generation catalyst was 0.17 or more with respect to the total amount of the non-methane hydrocarbon contained in the exhaust gas ($C_2H_2$ amount/total NMHC amount ≥0.17), a high NOx conversion rate of 90% or more to 95% or more could be achieved.

<Performance Evaluation II>

According to the exhaust gas purifying systems of the above-mentioned examples, the amount of the hydrocarbon with C2 to C5 with respect to the total HC amount in the exhaust gas supplied to the NOx purifying catalyst 34 from the HC generation catalyst 33A within the rich range was measured by the gas chromatography-mass spectrometer, in the same manner as the performance evaluation I. In addition, a NOx conversion rate of the NOx purifying catalyst 34 within the rich range was obtained by measuring NOx concentrations at the inlet side and the outlet side of the NOx purifying catalyst 34 by use of the chemiluminescent NOx analyzer. The result is shown in FIG. 10.

Figure 10:
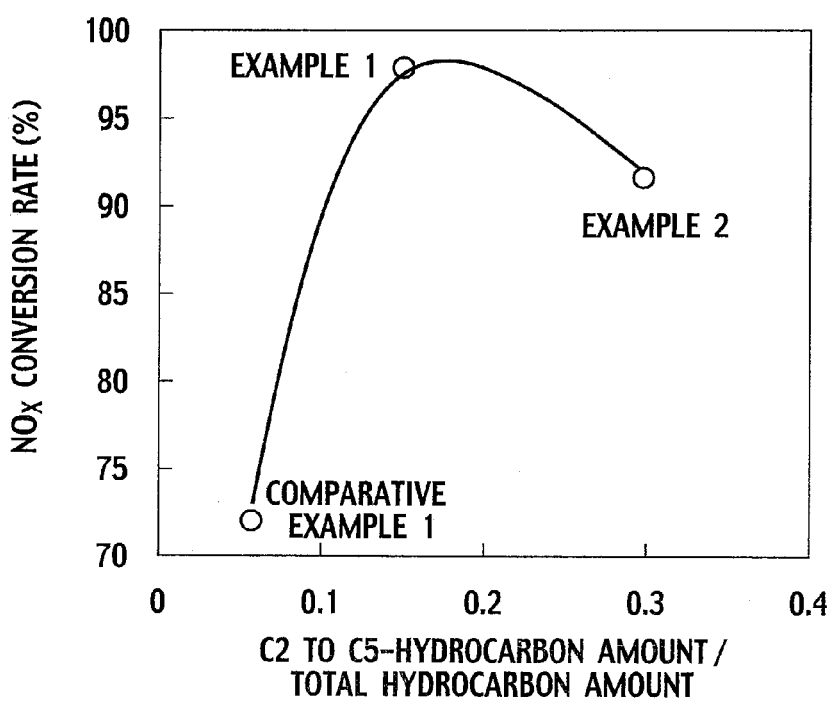
FIG. 10 is a graph showing a NOx conversion rate for an amount of a hydrocarbon with a carbon number of 2 to 5/a total hydrocarbon amount in exhaust gas supplied to a NOx purifying catalyst from a HC generation catalyst.

As shown in FIG. 10, it was recognized that the NOx conversion rate in the NOx purifying catalyst was higher, as the content ratio of the hydrocarbon with C2 to C5 supplied to the NOx purifying catalyst from the HC generation catalyst was higher. Especially, when the amount of the hydrocarbon with C2 to C5 supplied from the HC generation catalyst was 0.1 or more, more preferably 0.12 or more, for the total hydrocarbon amount contained in an exhaust gas (amount of HC with C2 to C5/total HC amount ≥0.1), a high NOx conversion rate of 90% or more could be achieved. This is because hydrogen was generated together with the lower hydrocarbon with C2 to C5 from the unburned hydrocarbon in the exhaust gas because of an oxidative dehydrogenation reaction in the HC generation catalyst and a condensation associated therewith when the air-fuel ratio was shifted from a lean condition to a rich condition, so that a sufficient amount of hydrogen as a reducing agent was supplied to the NOx purifying catalyst. In addition, since the lower hydrocarbon with C2 to C5 has higher reactivity than the hydrocarbon with more than C5, it is considered that the lower hydrocarbon also functions as a reducing agent in the NOx purifying catalyst, so as to improve the NOx purification efficiency.

<Performance Evaluation III>

According to the exhaust gas purifying systems of the above-mentioned examples, the amount of the hydrocarbon with C2 to C5 other than acetylene with respect to the total amount of the hydrocarbon with C2 to C5 in the exhaust gas supplied to the NOx purifying catalyst 34 from the HC generation catalyst 33A within the rich range was measured by the gas chromatography-mass spectrometer, in the same manner as the performance evaluation I. In addition, a NOx conversion rate of the NOx purifying catalyst 34 within the rich range was obtained by measuring NOx concentrations at the inlet side and the outlet side of the NOx purifying catalyst 34 by use of the chemiluminescent NOx analyzer. The result is shown in FIG. 11.

Figure 11:
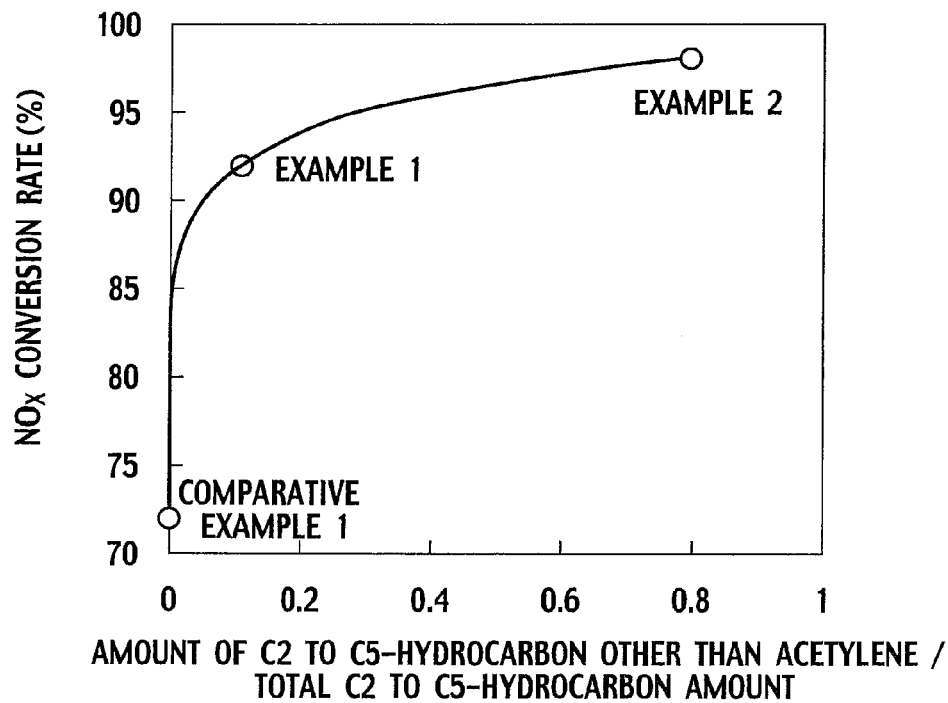
FIG. 11 is a graph showing a NOx conversion rate for an amount of a hydrocarbon with a carbon number of 2 to 5 other than acetylene/a total amount of a hydrocarbon with a carbon number of 2 to 5 in exhaust gas supplied to a NOx purifying catalyst from a HC generation catalyst.

As shown in FIG. 11, it was recognized that the NOx conversion rate in the NOx purifying catalyst was higher, as the content ratio of the hydrocarbon with C2 to C5 other than acetylene supplied to the NOx purifying catalyst from the HC generation catalyst was higher. Especially, when the amount of the hydrocarbon with C2 to C5 other than acetylene supplied from the HC generation catalyst was 0.05 or more, more preferably 0.1 or more, with respect to the total amount of the hydrocarbon with C2 to C5 contained in the exhaust gas (amount of HC with C2 to C5 other than $C_2H_2$/total amount of HC with C2 to C5≥0.05), a high NOx conversion rate of 90% or more could be achieved. This is because hydrogen and the lower hydrocarbon with C2 to C5 were generated from the hydrocarbon in the exhaust gas, and the lower hydrocarbon with C2 to C5 other than acetylene also functions as a reducing agent together with hydrogen in the NOx purifying catalyst.

<Performance Evaluation IV>

Figure 12:
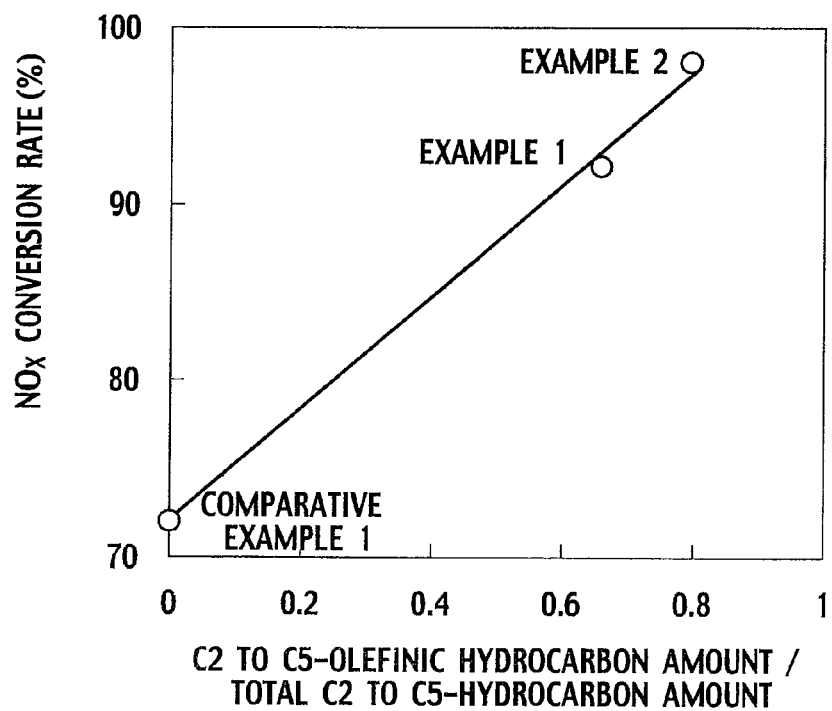
FIG. 12 is a graph showing a NOx conversion rate for an amount of an olefinic hydrocarbon with a carbon number of 2 to 5/a total amount of a hydrocarbon with a carbon number of 2 to 5 in exhaust gas supplied to a NOx purifying catalyst from a HC generation catalyst.

According to the exhaust gas purifying systems of the above-mentioned examples, the amount of the olefinic hydrocarbon with C2 to C5 with respect to the total amount of the hydrocarbon with C2 to C5 in the exhaust gas supplied to the NOx purifying catalyst 34 from the HC generation catalyst 33A within the rich range was measured by the gas chromatography-mass spectrometer, in the same manner as the performance evaluation I. In addition, a NOx conversion rate of the NOx purifying catalyst 34 within the rich range was obtained by measuring NOx concentrations at the inlet side and the outlet side of the NOx purifying catalyst 34 by use of the chemiluminescent NOx analyzer. The result is shown in FIG. 12. Further, a residual rate of hydrogen in the exhaust gas at an outlet of the NOx purifying catalyst 34 within the rich range was measured by the gas chromatography-mass spectrometer. The result is shown in FIG. 13.

As shown in FIG. 12, it was found that there was a mutual relation between the amount of the olefinic hydrocarbon with C2 to C5 supplied to the NOx purifying catalyst from the HC generation catalyst and the NOx conversion rate to reduce nitrogen oxide to nitrogen. When the amount of the olefinic hydrocarbon with C2 to C5 was 0.6 or more with respect to the total amount of the hydrocarbon with C2 to C5 contained in the exhaust gas supplied to the NOx purifying catalyst from the HC generation catalyst (amount of olefinic hydrocarbon with C2 to C5/total amount of HC with C2 to C5≥0.6), a high NOx conversion rate of 90% or more could be achieved. Moreover, when the amount of the olefinic hydrocarbon with C2 to C5 was 0.8 or more (amount of olefinic hydrocarbon with C2 to C5/total amount of HC with C2 to C5≥0.8), an extremely high NOx conversion rate of approximately 99% could be achieved.

Figure 13:
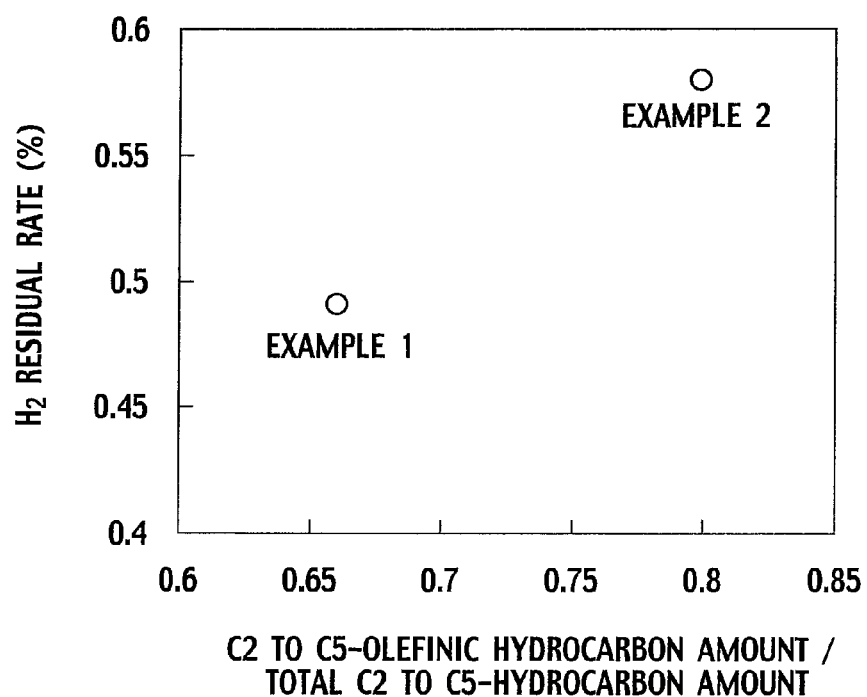
FIG. 13 is a graph showing a hydrogen residual rate at an outlet of a NOx purifying catalyst for an amount of an olefinic hydrocarbon with a carbon number of 2 to 5/a total amount of a hydrocarbon with a carbon number of 2 to 5 in exhaust gas supplied to a NOx purifying catalyst from a HC generation catalyst.

As shown in FIG. 13, as the amount of the olefinic hydrocarbon with C2 to C5 supplied to the NOx purifying catalyst from the HC generation catalyst increases, the residual rate of hydrogen in the exhaust gas at the outlet of the NOx purifying catalyst increases. According to this result, it is recognized that as the amount of the olefinic hydrocarbon with C2 to C5 generated in the HC generation catalyst increases, the amount of the reducing agent ($H_2$) generated together with this lower olefinic hydrocarbon increases. In addition, it is recognized that the oxidative dehydrogenation reaction of the olefinic hydrocarbon with C2 to C5 is promoted, so that generated hydrogen and the like is effectively used as a reducing agent. Thus, a high NOx conversion rate can be achieved.

Second Embodiment

The following is a description of an exhaust gas purifying system of the present embodiment with reference to the drawings. As shown in FIG. 1, the exhaust gas purifying system of the present embodiment includes the NOx purifying catalyst 34 provided downstream in the exhaust gas flow path 3 in the internal combustion engine 1, and the HC generator 33 provided upstream of the NOx purifying catalyst 34, similar to First Embodiment. The NOx purifying catalyst 34 has a function similar to First Embodiment to purify exhaust gas by absorbing and releasing nitrogen oxide (NOx) in the exhaust gas. The HC generator 33 used in the present embodiment has a function similar to First Embodiment to generate acetylene ($C_2H_2$) and/or the hydrocarbon with a carbon number of 2 to 5 (C2 to C5) other than acetylene from the hydrocarbon in the exhaust gas emitted from the internal combustion engine 1. While First Embodiment utilizes the HC generation catalyst 33A including the HC conversion catalyst as the HC generator 33, the present embodiment uses an HC generator 33B described below.

Figure 14:
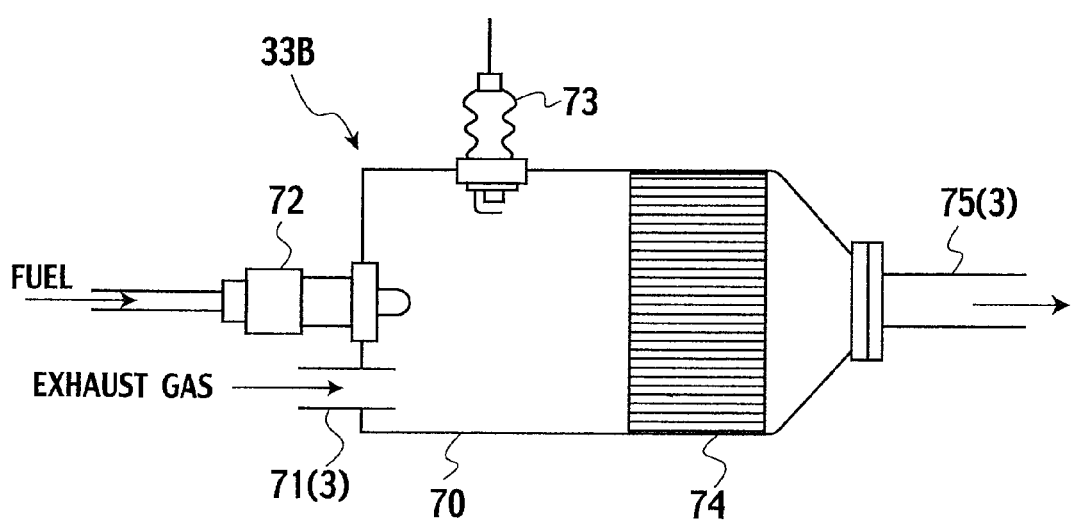
FIG. 14 is a schematic view showing an example of an HC generator used in an exhaust gas purifying system according to Second Embodiment.

As shown in FIG. 14, the HC generator 33B includes, in a reaction chamber 70, a supply pipe 71 for supplying at least some of the exhaust gas emitted from the internal combustion engine 1, a fuel injection device 72 for supplying fuel gas to the reaction chamber 70, and a spark plug 73 including electrodes for sparklingly igniting a mixture of the exhaust gas and the fuel gas by electric discharge. Further, the HC generator 33B includes a rectifier 74 for rectifying a flow of generated acetylene and/or the hydrocarbon with the carbon number of 2 to 5 other than acetylene, and a discharge pipe 75 for supplying generated acetylene and the like to the NOx purifying catalyst 34. The HC generator 33B of this embodiment can be exchanged for the HC generation catalyst 33A in the exhaust gas purifying system shown in FIG. 6. Therefore, as for the fuel injection device 72, the second fuel supply passage 6, the second supply pump 61 and the injector 62 shown in FIG. 6 can be used.

Acetylene and/or the hydrocarbon with the carbon number of 2 to 5 other than acetylene are generated by the following method using the HC generator 33B. First, the exhaust gas emitted from the internal combustion engine 1 is supplied to the reaction chamber 70 via the supply pipe 71. Then, the fuel gas is supplied to the reaction chamber 70 via the fuel injection device 72. In this case, the exhaust gas and the fuel gas are adjusted so that an air-fuel ratio ($\lambda$) in mixed gas of the exhaust gas and the fuel gas is 0.9 or less, and an oxygen concentration in the mixed gas is 0.8 to 1.5 vol %. The oxygen concentration can be adjusted within the above-mentioned range by controlling degree of opening of the intake throttle valve 24 and the EGR valve 25, as described in First Embodiment. The air-fuel ratio ($\lambda$) can be adjusted within the above-mentioned range by controlling the injection amount of the fuel from the fuel injection device 72.

Then, after the exhaust gas and the fuel gas are mixed in the reaction chamber 70, the fuel gas is burned by the spark ignition by the spark plug 73. As a result, acetylene and/or the hydrocarbon with the carbon number of 2 to 5 other than acetylene are generated so as to be rectified by the rectifier 74. Thus, acetylene and the like are supplied to the NOx purifying catalyst 34 via the discharge pipe 75.

As described above, the present embodiment utilizes the HC generator 33B instead of the HC generation catalyst 33A. Therefore, a necessary amount of acetylene and/or the hydrocarbon with the carbon number of 2 to 5 other than acetylene can be supplied to the NOx purifying catalyst 34 when necessary. Namely, the NOx purifying catalyst 34 can absorb a certain amount of nitrogen oxide (NOx). Therefore, NOx is released from the NOx trap material, so as to reduce NOx efficiently by the reducing gas by controlling the air-fuel ratio to be stoichiometric or rich by the internal combustion engine, while supplying acetylene and the like to the NOx purifying catalyst 34 using the HC generator 33B when the NOx absorption amount reaches saturation.

In the HC generator 33B shown in FIG. 14, at least some of the exhaust gas emitted from the internal combustion engine 1 is supplied to the reaction chamber 70 via the supply pipe 71. Alternatively, air may be externally supplied to the reaction chamber 70 via the supply pipe 71 instead of the exhaust gas. Note that, although the unburned hydrocarbon remains in the exhaust gas, the hydrocarbon does not remain in the air. Therefore, extra fuel gas is required to be supplied to the reaction chamber 70 to some extent in order to control the air-fuel ratio ($\lambda$) in the mixed gas to be 0.9 or less.

Similar to First Embodiment, the acetylene amount generated in the HC generator 33B is preferably 0.03 or more in a volume ratio with respect to the total amount of the hydrocarbon in the exhaust gas supplied to the NOx purifying catalyst 34. The acetylene amount supplied to the NOx purifying catalyst 34 from the HC generator 33B is preferably 0.17 or more in a volume ratio with respect to the total amount of the non-methane hydrocarbon in the exhaust gas supplied to the NOx purifying catalyst 34. The amount of the hydrocarbon with C2 to C5 supplied to the NOx purifying catalyst 34 from the HC generator 33B is preferably 0.1 or more in a volume ratio with respect to the total amount of the hydrocarbon in the exhaust gas supplied to the NOx purifying catalyst 34 (amount of HC with C2 to C5/total HC amount ≥0.1). The amount of the hydrocarbon with C2 to C5 other than $C_2H_2$ supplied to the NOx purifying catalyst 34 from the HC generator 33B is preferably 0.05 or more in a volume ratio with respect to the total amount of the hydrocarbon with C2 to C5 in the exhaust gas supplied to the NOx purifying catalyst 34. The amount of the olefinic hydrocarbon with C2 to C5 generated in the HC generation catalyst is preferably 0.6 or more, more preferably 0.8 or more in a volume ratio with respect to the total amount of the hydrocarbon with C2 to C5 in the exhaust gas supplied to the NOx purifying catalyst 34.

Examples of the lower hydrocarbon with C2 to C5 other than $C_2H_2$ generated in the HC generator 33B include a paraffinic hydrocarbon (such as methane, ethane, propane, butane, pentane), an olefinic hydrocarbon (such as ethylene, propylene, 1-butene, 2-butene, 1-pentene), and an acetylene hydrocarbon (such as propine, 1-butyne, 2-butyne, 1-pentine). Similar to First Embodiment, the content of the olefinic hydrocarbon with C2 to C5 having a multiple bond, especially a double bond, is preferably more than others among acetylene and the lower hydrocarbon with C2 to C5 other than $C_2H_2$ generated in the HC generator 33B.

Third Embodiment

The following are descriptions of an exhaust gas purifying system and an exhaust gas purifying method according to the present embodiment with reference to the drawings.

As shown in FIG. 1, the exhaust gas purifying system of the present embodiment includes the NOx purifying catalyst 34 provided downstream in the exhaust gas flow path 3 in the internal combustion engine 1, and an HC generator 133 provided upstream of the NOx purifying catalyst 34, similar to First Embodiment. The NOx purifying catalyst 34 has a function similar to First Embodiment to purify exhaust gas by absorbing and releasing nitrogen oxide (NOx) in the exhaust gas. The HC generator 133 used in the system of the present embodiment has a function to generate an aromatic hydrocarbon from a hydrocarbon in the exhaust gas.

Figure 15:
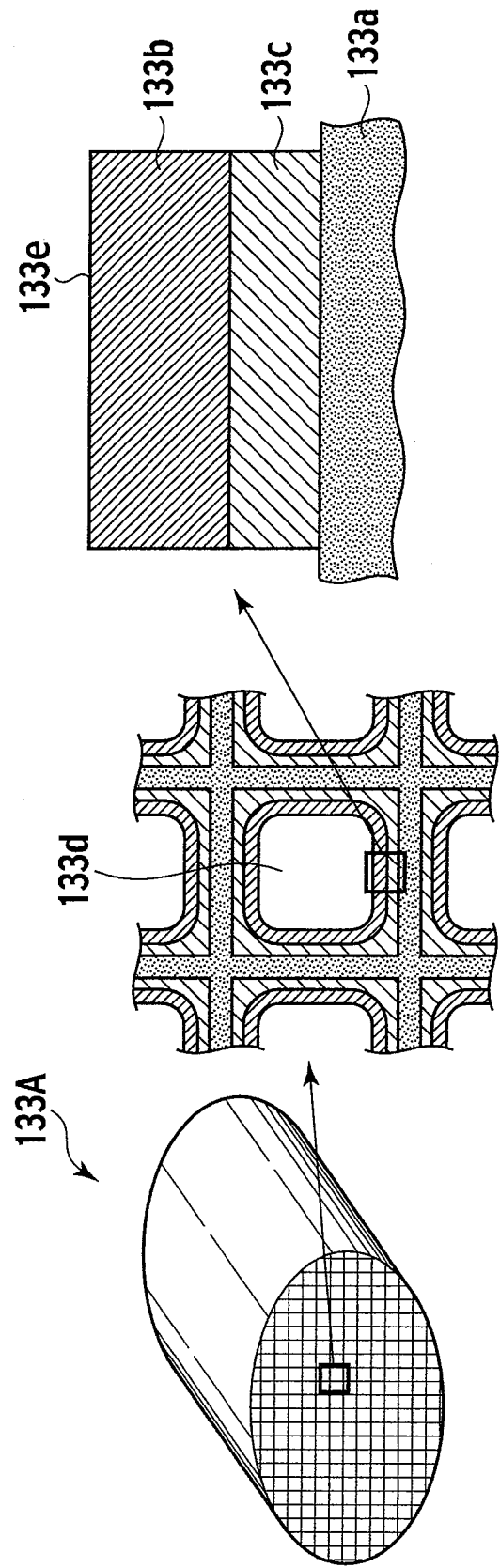
FIG. 15 is a perspective view and a partially enlarged view showing an example of a HC generation catalyst used in an exhaust gas purifying system according to Third Embodiment.

First, the HC generator 133 provided upstream in the exhaust gas flow path 3 will be explained. As for the HC generator 133, a HC generation catalyst 133A to generate the aromatic hydrocarbon from the hydrocarbon in the exhaust gas can be used. FIG. 15 is a perspective view and a partially enlarged view showing an example of the HC generation catalyst 133A used in the exhaust gas purifying system of the present embodiment. The HC generation catalyst 133A includes a cordierite honeycomb monolithic substrate 133a on which a catalyst layer 133c including an HC conversion catalyst and a catalyst layer 133b including both the HC conversion catalyst and an OSC material are supported.

The HC generation catalyst 133A preferably includes the HC conversion catalyst to convert a paraffinic hydrocarbon with a carbon number of 6 or more (C6 or more) and an olefinic hydrocarbon with a carbon number of 6 or more in the exhaust gas to the aromatic hydrocarbon, and preferably includes the OSC material having a high oxygen absorption and release property. The HC conversion catalyst preferably includes at least one noble metal element selected from the group consisting of platinum (Pt), rhodium (Rh) and palladium (Pd). Examples of the OSC material include a transition metal element, specifically, an oxide including at least one transition metal element selected from the group consisting of cerium (Ce) and praseodymium (Pr). Examples of such an oxide include cerium dioxide ($CeO_2$) and praseodymium oxide ($Pr_6O_{11}$).

The amount the HC conversion catalyst supported on the HC generation catalyst 133A, specifically the amount of noble metal such as Pt, Rh or Pd, is preferably 2.8 to 12.0 g/L. When the supported amount of the noble metal element supported on the HC generation catalyst 133A is 2.8 to 12.0 g/L, the paraffinic hydrocarbon with C6 or more and/or the olefinic hydrocarbon with C6 or more in an exhaust gas can be converted to the aromatic hydrocarbon efficiently due to a dehydrogenation reaction. In addition, a reducing gas containing a large amount of hydrogen can be generated due to the dehydrogenation reaction of the above-mentioned hydrocarbon.

The HC conversion catalyst is preferably able to convert the unburned hydrocarbon in the exhaust gas to the aromatic hydrocarbon using a small amount of oxygen in which an oxygen concentration in the exhaust gas supplied to the HC generation catalyst 133A is 0.8 to 1.5 vol %, and able to generate hydrogen by the dehydrogenation reaction. In addition, the HC conversion catalyst is preferably activated at 200° C. or more.

In the HC generation catalyst 133A, the content of the noble metal element composing the HC conversion catalyst is preferably increased as closer to a surface having a large area with which the exhaust gas comes into contact, intermittently or continuously. Namely, as shown in FIG. 15, the content of the HC conversion catalyst is preferably increased toward an exhaust gas flow path 133d from the honeycomb substrate 133a. An example of a method of increasing the content of the HC conversion catalyst toward a surface 133e may include a method of repeatedly coating a plurality of slurry having different contents of noble metal to form a plurality of catalyst layers, so as to increasingly contain more noble metal toward the surface 133e.

The HC generation catalyst 133A preferably includes both the noble metal element composing the HC conversion catalyst and the transition metal element composing the OSC material in the same catalyst layer. When both the noble metal element and the transition metal element are contained in the same catalyst layer in the HC generation catalyst 133A, the unburned hydrocarbon such as the paraffinic hydrocarbon with C6 or more deprives of oxygen absorbed in the OSC material during the rich spike control operation. Then, due to the action of the HC conversion catalyst, the unburned hydrocarbon is easily converted to the aromatic hydrocarbon, and simultaneously, hydrogen is easily generated. Namely, both the HC conversion catalyst and the OSC material are preferably included in the same catalyst layer so that the dehydrogenation reaction to generate the aromatic hydrocarbon and hydrogen is easily occurred.

The HC generation catalyst 133A may be arbitrarily provided with either a catalyst layer only including the HC conversion catalyst or a catalyst layer only including the OSC material to be formed on the honeycomb substrate, in addition to the catalyst layer including both the HC conversion catalyst and the OSC material. In other words, although the catalyst layer has a double-layer structure in FIG. 15, the catalyst layer may be a single layer including at least one of the HC conversion catalyst and the OSC material, or may include three or more layers. When the HC conversion catalyst and the OSC material are supported on the honeycomb substrate, noble metal such as Pt, Rh and Pd that are the HC conversion catalyst or the oxide of Ce or Pr that are the OSC material may be dispersed on a carrier having a high specific surface area. As for the carrier having a high specific surface area, powder of alumina ($Al_2O_3$), zirconia ($ZrO_2$), titania ($TiO_2$) or the like may be used.

With regard to a method of forming the catalyst layer, first, at least one of slurry containing the noble metal element such as Pt, Rh or Pd, slurry containing the transition metal element of Ce or Pr, and slurry containing both the noble metal element and the transition metal element is prepared. Then, the slurry is provided on the monolithic substrate, followed by drying and baking so as to form the catalyst layer.

As for the HC generation catalyst 133A, the HC conversion catalyst and/or the OSC material may be granulated or pelletized. The granulated or pelletized HC conversion catalyst and OSC material may be filled in a container independently or by mixture, thereby providing in the exhaust gas flow path 3.

The amount of the aromatic hydrocarbon generated in the HC generation catalyst 133A is preferably 0.02 or more in a volume ratio with respect to the total amount of the non-methane hydrocarbon (NMHC) in the exhaust gas supplied to the NOx purifying catalyst 34 (aromatic HC amount/total NMHC amount ≥0.02). When the amount of the aromatic hydrocarbon supplied to the NOx purifying catalyst 34 from the HC generation catalyst 133A with respect to the total NMHC amount in the exhaust gas is 0.02 or more, an effective amount of hydrogen necessary and sufficient to reduce nitrogen oxide can be generated together with the aromatic hydrocarbon. In addition, the HC generation catalyst 133A can supply a reducing gas containing an effective amount of hydrogen necessary and sufficient to reduce nitrogen oxide to the NOx purifying catalyst. As a result, a NOx conversion rate to reduce nitrogen oxide to nitrogen can be improved. Further, when the amount of the aromatic hydrocarbon supplied to the NOx purifying catalyst 34 with respect to the total NMHC amount in the exhaust gas is 0.02 or more, reducing gas containing a sufficient amount of a reducing agent ($H_2$) necessary to purify NOx can be generated while the amount of NMHC, which may easily cause photochemical smog, is reduced. The respective amounts of the aromatic hydrocarbon and the non-methane hydrocarbon in the exhaust gas supplied to the NOx purifying catalyst 34 can be obtained by analyzing the exhaust gas using a gas chromatography-mass spectrometer.

As for the NOx purifying catalyst provided downstream of the HC generation catalyst 133A, the NOx purifying catalyst 34 described in First Embodiment can be employed in the exhaust gas purifying system of the present embodiment. As for the exhaust gas purifying system, the systems shown in FIGS. 5 and 6 described in First Embodiment can be employed. Note that, in the exhaust gas purifying system of the present embodiment, the HC generation catalyst 133A is preferably supplied with gas containing a large amount of the paraffinic hydrocarbon with C6 or more and/or the olefinic hydrocarbon with C6 or more during the rich spike control operation. Namely, the gas containing the paraffinic hydrocarbon with C6 or more and/or the olefinic hydrocarbon with C6 or more is preferably supplied to the HC generation catalyst 133A using the above-described fuel gas supplying device.

For example, when the gas containing the paraffinic hydrocarbon with C6 or more and/or the olefinic hydrocarbon with C6 or more is supplied to the HC generation catalyst 133A by use of the fuel gas supplying device during the rich spike control operation, the aromatic hydrocarbon is generated from the hydrocarbon with C6 or more in the HC generation catalyst 133A. In addition, hydrogen as a reducing agent is generated due to the dehydrogenation reaction according to the generation of the aromatic hydrocarbon. Therefore, when a reducing gas containing a large amount of hydrogen to be a reducing agent is generated in the HC generation catalyst 133A during the rich spike control operation, the reducing gas is supplied to the NOx purifying catalyst 34. Accordingly, a NOx conversion rate (reduction rate) of nitrogen oxide released from the catalyst can be enhanced.

As described above, in the exhaust gas purifying system, the gas containing a large amount of the paraffinic hydrocarbon with C6 or more and/or the olefinic hydrocarbon with C6 or more is preferably supplied to the HC generation catalyst 133A. Thus, the exhaust gas purifying system can be favorably used for a diesel engine using light oil as fuel containing a large amount of the hydrocarbon with a large carbon number.

The following is a further description of the present invention referring to examples and a comparative example. However, the present invention is not limited to these examples.

Example 3 employed the HC generation catalyst 1 and the NOx purifying catalyst in Example 1. Example 4 employed the HC generation catalyst 2 and the NOx purifying catalyst in Example 2. As shown in FIG. 6, the HC generation catalyst 133A (the HC generation catalyst 1 of Example 3 or the HC generation catalyst 2 of Example 4) was installed upstream in the exhaust gas flow path 3 of an in-line four cylinder direct-injection diesel engine 1 with a displacement of 2500 cc manufactured by NISSAN MOTOR CO., LTD., so as to configure an exhaust gas purifying system. In addition, the NOx purifying catalyst 34 was installed downstream of the HC generation catalyst 133A. Meanwhile, in Comparative Example 2, only the NOx purifying catalyst 34 was installed in the exhaust gas flow path 3 without installing the HC generation catalyst 133A, so as to configure an exhaust gas purifying system.

Next, an operation for a rich spike control to drive each of the exhaust gas purifying systems of Example 3 and 4 and Comparative Example 2 in a lean condition (A/F=30) for 40 seconds, followed by driving in a rich condition (A/F=11.7) for 2 seconds was repeated. Then, during the rich spike control operations, fuel was injected directly to the exhaust gas flow path 3 at an inlet of the HC generation catalyst 133A from the fuel gas supplying device (the injector 62), so as to supply gas containing the paraffinic hydrocarbon with C6 or more and/or the olefinic hydrocarbon with C6 or more to the HC generation catalyst 133A. An excess air ratio ($\lambda$) of the exhaust gas during the rich spike control operation was controlled to be 1.0 or less. An oxygen concentration of exhaust air was controlled to be 0.8 to 1.2 vol % according to the method disclosed in Japanese Patent No. 3918402. The fuel to be used was commercially available JIS 2 light oil. The inlet temperature of the HC generation catalyst 133A was set at 220° C.

The amount of the aromatic hydrocarbon with respect to the total amount of NMHC in the exhaust gas supplied to the NOx purifying catalyst 34 from the HC generation catalyst 133A during the rich spike control operation was measured by a gas chromatography-mass spectrometer. In addition, a NOx conversion rate of the NOx purifying catalyst 34 during the rich spike control operation was obtained by measuring NOx concentrations at the inlet side and the outlet side of the NOx purifying catalyst 34 by use of a chemiluminescent NOx analyzer. The result is shown in FIG. 16.

Figure 17:
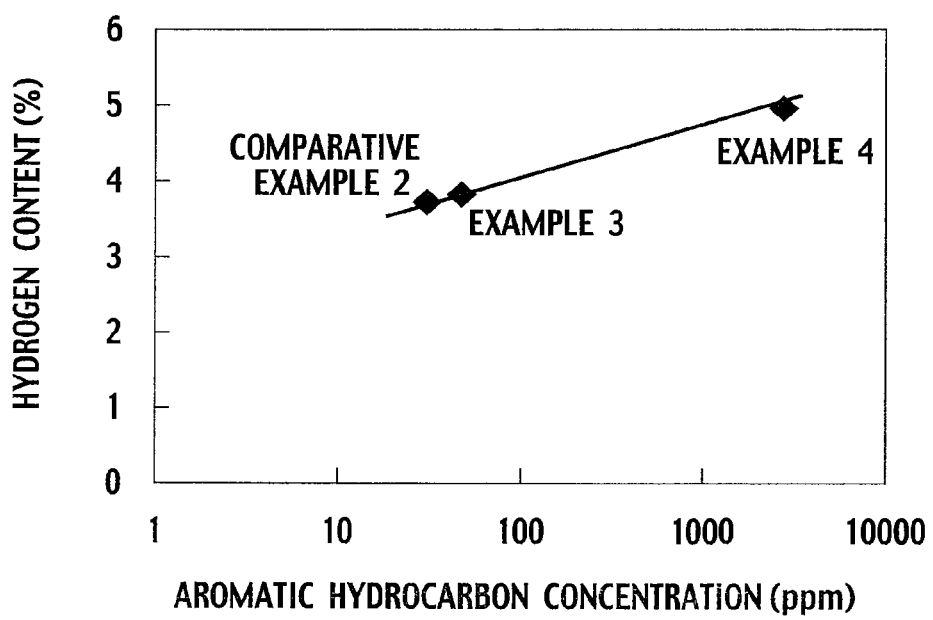
FIG. 17 is a graph showing a hydrogen content (%) for a concentration (ppm) of an aromatic hydrocarbon in exhaust gas supplied to a NOx purifying catalyst from a HC generation catalyst.

Further, a concentration (ppm) of the aromatic hydrocarbon in the exhaust gas supplied to the NOx purifying catalyst 34 from the HC generation catalyst 133A, and the hydrogen content (%) for the total exhaust gas amount in the exhaust gas during the rich spike control operation were obtained by use of the chemiluminescent NOx analyzer. The result is shown in FIG. 17. The concentration (ppm) of the aromatic hydrocarbon in the exhaust gas represents a volume ratio of the aromatic hydrocarbon in the exhaust gas, and the hydrogen content (%) for the total exhaust gas amount also represents a volume ratio of hydrogen in the exhaust gas.

Figure 16:
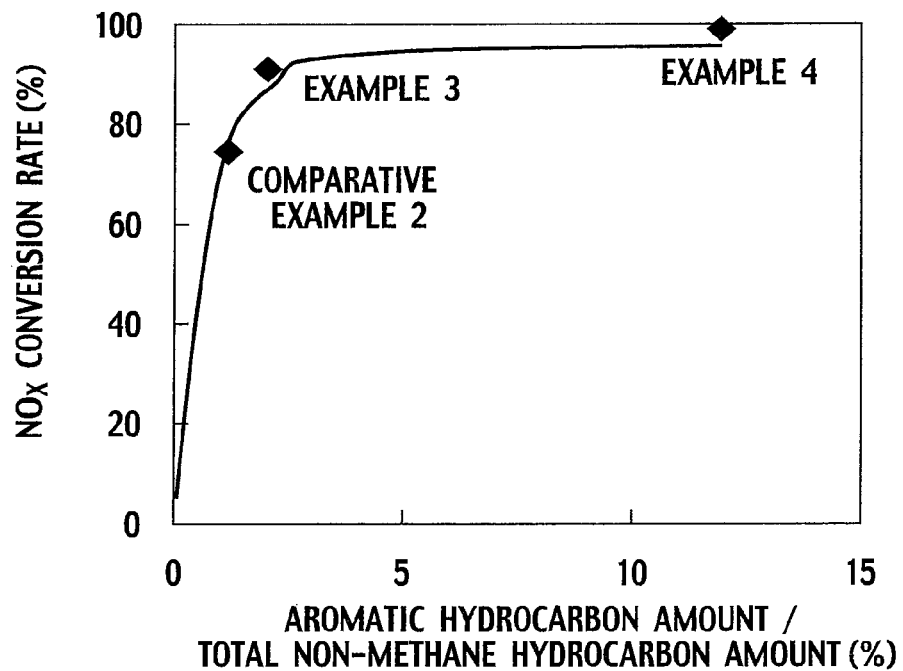
FIG. 16 is a graph showing a NOx conversion rate for an aromatic hydrocarbon amount/a total non-methane hydrocarbon amount in exhaust gas supplied to a NOx purifying catalyst from a HC generation catalyst.

As shown in FIG. 16, it was recognized that the NOx conversion rate in the NOx purifying catalyst was higher, as the content ratio of the aromatic hydrocarbon in the exhaust gas supplied to the NOx purifying catalyst from the HC generation catalyst was higher. Especially, when the amount of the aromatic hydrocarbon with respect to the total amount of NMHC contained in the exhaust gas was 2.0% or more (aromatic HC amount/total HC amount ≥0.02), a high NOx conversion rate of 90% or more could be achieved. With regard to the exhaust gas purifying system not equipped with the HC generation catalyst (Comparative Example 2), the NOx conversion rate was less than 80%. According to these results, hydrogen was generated together with the aromatic hydrocarbon in the HC generation catalyst 133A due to a dehydrogenation reaction by supplying the gas containing the paraffinic hydrocarbon with C6 or more and/or the olefinic hydrocarbon with C6 or more to the HC generation catalyst 133A during the rich spike control operation. Thus, it is assumed that the NOx conversion rate was improved due to the generated hydrogen. This can also be confirmed from the result shown in FIG. 17. Namely, as shown in FIG. 17, when the aromatic hydrocarbon was generated in the HC generation catalyst 133A, the generation amount of hydrogen increased with the increase of the generation amount of the aromatic hydrocarbon.

The entire content of Japanese Patent Application No. P2008-206848 (filed on Aug. 11, 2008) is herein incorporated by reference.

Although the invention has been described above by reference to the embodiments and examples of the invention, the invention is not limited to the embodiments and examples described above, and modifications may become apparent to these skilled in the art, in light of the teachings herein.

INDUSTRIAL APPLICABILITY

According to the present invention, a HC generator to generate acetylene and/or a hydrocarbon with a carbon number of 2 to 5 other than acetylene from a hydrocarbon in an exhaust gas is provided upstream of a NOx purifying catalyst to absorb and release NOx in the exhaust gas. Therefore, hydrogen and carbon monoxide and the like are generated from an unburned hydrocarbon in the exhaust gas due to an oxidative dehydrogenation reaction in the HC generator, together with acetylene and/or the hydrocarbon with the carbon number of 2 to 5 other than acetylene. Accordingly, reducing gas containing a large amount of hydrogen and the like as a reducing agent is sufficiently supplied to the NOx purifying catalyst, so as to improve NOx purification efficiency.

Further, according to the present invention, the HC generator to generate aromatic hydrocarbon from a hydrocarbon in an exhaust gas is provided upstream of the NOx purifying catalyst. In addition, the HC generator is supplied with gas containing an olefinic hydrocarbon with a carbon number of 6 or more and/or a paraffinic hydrocarbon with a carbon number of 6 or more. Therefore, hydrogen is generated due to a dehydrogenation reaction in the HC generator together with aromatic hydrocarbon. Accordingly, reducing gas containing a large amount of hydrogen and the like as a reducing agent is sufficiently supplied to the NOx purifying catalyst, so as to improve NOx purification efficiency.

REFERENCE SIGNS LIST

1 Internal combustion engine
3 Exhaust gas flow path
33 HC generator
34 NOx purifying catalyst
100 Exhaust gas purifying system

The invention claimed is:

1. An exhaust gas purifying system, comprising:
an internal combustion engine which generates exhaust gas;
an exhaust gas flow path connected to the internal combustion engine;
a NOx purifying catalyst disposed in the exhaust flow path to purify nitrogen oxide in the exhaust gas;
an HC generator, disposed upstream of the NOx purifying catalyst in the exhaust gas flow path, to generate at least one of acetylene, a hydrocarbon with a carbon number of 2 to 5 other than acetylene, and an aromatic hydrocarbon from a hydrocarbon contained in an exhaust gas; and
an engine control unit, connected with the internal combustion engine, configured to control the internal combustion engine to adjust an oxygen concentration in the exhaust gas supplied to the HC generator to 0.8 to 1.5 vol % to generate hydrogen in the HC generator when an air-fuel ratio of the exhaust gas is stoichiometric or rich.

2. The exhaust gas purifying system according to claim 1, wherein the HC generator is an HC generation catalyst, and an amount of the hydrocarbon with the carbon number of 2 to 5 with respect to a total amount of the hydrocarbon in the exhaust gas supplied to the NOx purifying catalyst from the HC generation catalyst is 0.1 or more in terms of a volume ratio.

3. The exhaust gas purifying system according to claim 1, wherein the HC generator is an HC generation catalyst, and an amount of the hydrocarbon with the carbon number of 2 to 5 other than acetylene with respect to a total amount of a hydrocarbon with the carbon number of 2 to 5 in the exhaust gas supplied to the NOx purifying catalyst from the HC generation catalyst is 0.05 or more in terms of a volume ratio.

4. The exhaust gas purifying system according to claim 1, wherein the hydrocarbon with the carbon number of 2 to 5 other than acetylene contains an olefinic hydrocarbon.

5. The exhaust gas purifying system according to claim 1, wherein the HC generator is an HC generation catalyst, and an amount of the aromatic hydrocarbon with respect to a total amount of a non-methane hydrocarbon in the exhaust gas supplied to the NOx purifying catalyst from the HC generation catalyst is 0.02 or more in terms of a volume ratio.

6. The exhaust gas purifying system according to claim 1, further comprising a fuel injection valve configured to supply fuel to the exhaust gas.

7. The exhaust gas purifying system according to claim 1, wherein the HC generator is an HC generation catalyst, and an amount of acetylene with respect to a total amount of the hydrocarbon in the exhaust gas supplied to the NOx purifying catalyst from the HC generation catalyst is 0.03 or more in terms of a volume ratio.

8. The exhaust gas purifying system according to claim 7, wherein the amount of acetylene with respect to a total amount of an non-methane hydrocarbon in the exhaust gas supplied to the NOx purifying catalyst from the HC generation catalyst is 0.17 or more in terms of the volume ratio.

9. The exhaust gas purifying system according to claim 1, wherein the HC generator is an HC generation catalyst, and an amount of an olefinic hydrocarbon with the carbon number of 2 to 5 with respect to a total amount of the hydrocarbon with the carbon number of 2 to 5 in the exhaust gas supplied to the NOx purifying catalyst from the HC generation catalyst is 0.6 or more in terms of a volume ratio.

10. The exhaust gas purifying system according to claim 9, wherein the amount of the olefinic hydrocarbon with the carbon number of 2 to 5 with respect to the total amount of the hydrocarbon with the carbon number of 2 to 5 in the exhaust gas supplied to the NOx purifying catalyst from the HC generation catalyst is 0.8 or more in terms of the volume ratio.

11. The exhaust gas purifying system according to claim 1, wherein the HC generator is an HC generation catalyst, and the HC generation catalyst comprises: an HC conversion catalyst containing at least one element selected from the group consisting of platinum, rhodium and palladium; and an OSC material having an oxygen absorption ability.

12. The exhaust gas purifying system according to claim 11, wherein, in the HC generation catalyst, a content of the HC conversion catalyst increases closer to a surface with which the exhaust gas comes into contact.

13. The exhaust gas purifying system according to claim 11, wherein a content of the HC conversion catalyst is 2.8 to 12.0 g/L.

14. An exhaust gas purifying method, comprising:
providing an exhaust gas purifying system comprising: a NOx purifying catalyst that is disposed in an exhaust gas flow path of an internal combustion engine to purify nitrogen oxide; an HC generator that is disposed upstream of the NOx purifying catalyst in the exhaust gas flow path to generate at least one of acetylene, a hydrocarbon with a carbon number of 2 to 5 other than acetylene, and an aromatic hydrocarbon from a hydrocarbon contained in an exhaust gas; and an engine control unit connected with the internal combustion engine; and adjusting an oxygen concentration in the exhaust gas supplied to the HC generator to 0.8 to 1.5 vol % by the engine control unit to generate hydrogen in the HC generator when an air-fuel ratio is stoichiometric or rich.

15. The exhaust gas purifying method according to claim 14, wherein the HC generator is an HC generation catalyst, and the HC generation catalyst is controlled to be 200° C. or higher when the air-fuel ratio is stoichiometric or rich.

* * * * *